(12) United States Patent
Okamoto

(10) Patent No.: US 6,425,566 B1
(45) Date of Patent: Jul. 30, 2002

(54) METHOD OF INCLINING A BODY

(76) Inventor: Yoichiro Okamoto, 13-24-203, Kujyominami 3-chome, Nishi-ku, Osaki-shi, Osaka, 550 (JP)

( * ) Notice: Subject to any disclaimer, the term of this patent is extended or adjusted under 35 U.S.C. 154(b) by 0 days.

(21) Appl. No.: 08/829,997

(22) Filed: Apr. 2, 1997

(51) Int. Cl.[7] ............................................. A47G 29/00
(52) U.S. Cl. ............................ 248/371; 248/454; 108/8
(58) Field of Search ................................. 348/448, 453, 348/454, 447, 441.1, 371, 397; 108/8, 25

(56) References Cited

U.S. PATENT DOCUMENTS

| | | | | |
|---|---|---|---|---|
| 1,253,568 A | * | 1/1918 | Bartlett | 248/447 |
| 1,266,444 A | * | 5/1918 | Fosberg et al. | 248/477 |
| 1,691,191 A | * | 11/1928 | Henderson | 108/8 |
| 1,947,053 A | * | 2/1934 | Mason | 248/453 |
| 3,563,540 A | * | 2/1971 | Hopfeld | 482/31 |
| 3,991,967 A | * | 11/1976 | Sack | 248/448 |
| 4,781,355 A | * | 11/1988 | Jeantin | 248/441.1 |
| 4,948,465 A | * | 8/1990 | Rantala | 162/199 |

* cited by examiner

Primary Examiner—Anita King
(74) Attorney, Agent, or Firm—Koda & Androlia

(57) ABSTRACT

A body is mounted on a base 51. Fixed fulcrum systems 54a, 54b and 54c are set on the base 51. Shifting fulcrum systems 53a, 53b and 53c are set on the body so as to shift on the fixed fulcrum systems 54a, 54b and 54c respectively. The fixed and shifting fulcrum systems are combined to form a fulcrum. It is assumed that the shifting fulcrum systems shift in such a manner as to satisfy the condition of equilibrium and the condition of constancy in potential energy of the body. The fixed fulcrum systems 54a, 54b and 54c are formed like the envelopes on the shifting fulcrum systems 53a, 53b and 53c respectively in such motion. The body is inclined as the fulcrum is shifted.

3 Claims, 13 Drawing Sheets

$G_0O = r$
$T_0O = c$
$GC = h$
$DC = d$
$DP_k = t_k$ $\overline{AD} = a$
$\overline{AC} = b$

INCLINATION −30°

INCLINATION 50°

METHOD OF INCLINING A BODY

BACKGROUND OF THE INVENTION

1. Field of the Invention

The present invention relates to a general method of inclining a body with small force. The invention also relates to a book rack for use in a study, an office or the like, and to a display rack with which to watch television or the like at any desired angle.

2. Prior Art

A conventional, generally used method of inclining a body includes selecting a particular position as a fulcrum or a rotation axis, and turning the body on the fulcrum or axis.

Bookstands and bookends have conventionally been used to keep books and magazines by ones' sides for reading, deskwork, etc.

Various methods have been proposed for freely inclining racks or tables which support television sets, computer displays, industrial display terminals, etc. One of the methods includes fitting a bar or arm to a rack, and locking the bar or arm at a desired angle. Another method includes using a spring for balancing with the gravity of an inclining body. Still another method includes elastically coupling a monitor base, which has a spherical bottom, and a set base to each other with an H-shaped post, and sliding the spherical bottom on the set base to tilt the monitor base.

In general it is possible to incline a heavy body with minimum force by turning the body on an axis which extends through the center of gravity, because the body always keeps its balance. In practice, however, it is difficult to do so under circumstances of (about) design or use. Therefore, it is often necessary for a position off the center of gravity to be a fulcrum or a rotation axis. When a body is turned on a fulcrum or an axis off its center of gravity, the center of gravity necessarily changes in height. In order to tilt a heavy body or return the tilted body on such a fulcrum, there is a need of great force for balancing the body against the moment of gravity around the fulcrum. This results in consumption of additional energy which would otherwise not be necessary. Such problems have conventionally been coped with individually. It seems that great interest has not been taken to general methods of reducing the inclining force.

In view of this point, the inventor has studied or considered a general method of inclining a body with minimum force on a fulcrum positioned at the periphery of the body or another position off the center of gravity. This results in the present invention.

An inclining book rack is a thing to which this method is applied for handling books. In general, books are kept upright on bookshelves or in bookstands or between bookends. Soft books, like books with thin covers, magazines and files holding many papers, are apt to bend or fall down on bookshelves etc., so it is difficult for the books to stand. As a result, the bookshelves etc. are apt to be disordered, so books may be difficult to take out from them or put on them. Naturally, books are stabler when laid than when put upright.

Nevertheless, books are kept upright on bookshelves etc. presumably because upright books are easier to take out. In this case, however, the above problem cannot be avoided with regard to soft books.

Not only soft books, but also many books with hard covers, which are easy to handle, are often piled on desks and at nearby places. In this case, to take out a lower one of the piled books, it is necessary to remove the upper ones. Consequently, lower books are less apt to be used.

As stated above, books have such characters that they can be kept more stably if they are piled, while they can be taken out more conveniently if they are kept upright. If books are laid and piled when kept, and if all of the piled books are inclined to be upright when one or more of them are taken out, it is possible to both keep the books stably and take out one or more of them easily. If an apparatus is invented for easily effecting such switching, it would solve all of the above problems. Such a conception is the basis for the present invention as an inclining book rack. The total weight of piled books is fairly heavy, however, even if each of them is light, so it takes considerable force to incline them. Here, it is therefore significant to apply the above general method of inclining a body with minimum force.

Another example of application of this method would be a television rack with which to watch television at an arbitrary angle. As stated above, a television rack or the like may be inclined up and down by various methods. One of the methods includes fitting a bar or arm to a rack, and locking the bar or arm at a desired angle. In this method, however, there is such a limitation that the rack inclination cannot be very large. Another method includes using a spring for balancing with the gravity of an inclining body. In this method, however, the body stability is apt to be insufficient. Still another method includes sliding the spherical bottom of a monitor base on a set base to tilt a monitor. In this method, however, the inclination cannot be very large and the monitor movement is not liable to be smooth.

There seem to be few racks for inclining a television right and left, but it is difficult for a person in a lying posture to watch television. In particular, it is one of a few comforts to a person who is sick in bed to watch television While watching television, the person tries to adjust his/her head angularly to the television screen. As a result, the person's neck or shoulders are apt to be fatigued unconsciously. In order for a person in a lying natural posture to watch television, it is preferable to be able to adjust the television to the person angularly right and left. To this case also, it is possible to apply the above general method of inclining a body with minimum force.

SUMMARY OF THE INVENTION

It s an object of the present invention to provide a method of inclining a body by applying to the body minimum force which is necessary only to transit the body from the condition of equilibrium at an inclination to that at another inclination, in order to incline the body or return the inclined body. In the invention, a body is balanced always even while inclining, and its center of gravity is constant in height. It is possible to determine exactly by calculation the shapes of fulcrum systems for such best body inclination. Therefore, only if the position of the center of gravity can be grasped, desirable fulcrum Systems can be set flexibly without being restricted by the body shape.

A body supported by a plurality of fulcrums are very stable and can be held or fixed at any angle in a stepless manner. Contrariwise, on a body supported by a single fulcrum, there is no friction, and only the roll of the body shifts the fulcrum. It is therefore possible to incline the body with very small force.

It is another object of the invention to provide an inclining book rack which can stably hold even soft books with thin covers, magazines or document files, and from which one or more of the books or the like can be easily taken out. The rack is based on the method of piling up books when holding them, and making them upright when taking out one or more of them. It is easy to take out a lower one of the books piled on the rack. It is possible to return a read book only by placing it on the top of the piled books. It is therefore easy to keep a desk top from being disordered.

It is still another object of the invention to provide a display rack which is highly stable, and which can be held at any stepless angles, by applying the above inclining method. By properly setting fulcrum systems, it is possible to widen the range of inclination. Therefore, a person in a lying natural posture can watch television, without tiring his/her neck or shoulders in an attempt to adjust his/her head angularly to the television screen.

Further objects, characteristics and advantage of the present invention will be clarified in the following explanation.

In order to achieve the above objects, this invention is constructed as follows.

It is one of the characteristics of the invention to incline a body on a fulcrum while shifting the fulcrum. Therefore, the fulcrum part as a whole forms a line or a sequence of points. The fulcrum parts which enable fulcrums to shift as stated above will be referred to as "fulcrum Systems". The Systems on bodies will be called shifting fulcrum systems, while those on bases will be called fixed (basic) fulcrum systems. In general, the word "fulcrum" is associated with a fixed single point. As a little extended concept of this word, however, the word "fulcrum system" will be used herein.

The word "envelope" will be used herein to express the shape of a fixed fulcrum system, which may be not only a curve, but also a sequence of points.

A general method according to the invention for inclining a body placed on a base includes the following. First, a fixed fulcrum system and a shifting fulcrum system are set on the base and the body respectively. A fulcrum is formed by a combination of the fulcrum systems. It is then assumed that the shifting fulcrum system shifts in such a manner as to satisfy the condition of equilibrium and the condition of constancy in potential energy of the body.

The fixed fulcrum system is shaped in the form of the envelope on the shifting fulcrum system in such motion, or in the form of a curve or a sequence of points which is approximate to the envelope. The body is inclined as the fulcrum is shifted. The shifting fulcrum system can move in two ways, according to which the fixed fulcrum system may be shaped in two types respectively. In one of the two cases, there is a fulcrum always on or near the line of action of the gravity of a body. In this case, the shifting and fixed fulcrum systems engage with each other so securely as not to slip. In the other case, a plurality of fulcrums are formed at the same time to support a body. In the latter case, the shifting fulcrum system can slip on the fixed fulcrum system.

An inclining book rack to which the inclining method of the invention is applied includes a book holder and a shifting fulcrum system on the holder.

The holder filled with books corresponds to the body mentioned in regard to the method.

A display rack to which the inclining method is applied includes a table and a shifting fulcrum system on the table. The united body consisting of the table and the display on the table corresponds to the body mentioned regarding the method.

An inclining book rack for inclining piled books is provided in accordance with another method of the invention. The rack comprises a base and a holder. The base includes a pair of outer supports and a middle support between the outer supports. The holder has a bottom and a back. The back is supported by the middle support at a quarter of the height of the holder from the bottom, in such a manner that the holder holding books can freely turn on the support. The outer supports can support the inclined holder.

The operation of the present invention will be explained below.

It can be said that, in general, to incline a heavy body or return an inclined heavy body is to turn the body on a fulcrum or a rotation axis at a particular position on the body by applying to the body a moment of force against the moment of gravity around the fulcrum, so as to vary the body inclination, while balancing the body.

In this case, it can be considered that, in order to incline a body with minimum force, there is a need to satisfy the following two conditions.

First, at every angle to which the body is inclined, equilibrium is reached between the body and fulcrum without any force being applied from the outside (condition of equilibrium). Ideally, the force applied to incline the body should be used merely for the body transition from an angle to another, as the state of equilibrium is maintained. Second, while the body is inclining, the height of its center of gravity is constant (condition of constancy in potential energy). Height fluctuation of the center of gravity requires extra work for it, and therefore needs avoiding.

In solving the task of the invention, it has been the basic policy or line to construct the invention in such a manner as to satisfy the two conditions. In such a case, it is necessary to give attention to the positional relationship between the center of gravity and the fulcrum.

In the construction of the invention where a shifting fulcrum system shifts on a fixed fulcrum system, the contact point between the systems continuously moves, and the fixed fulcrum system becomes the locus of the point, in an ideal condition Therefore, the fixed fulcrum system can be considered to form an envelope for the shifting fulcrum system. Accordingly, the task of the invention of inclining a body on a base with minimum force results in the problem of finding the envelope shape satisfying the above two conditions, as the shape of the fixed fulcrum system on the base which is associated with the shifting fulcrum system set on the body.

As stated later in detail with regard to embodiments of the invention, there can be two cases with regard to such an envelope.

In the first case, the contact point (fulcrum) is positioned on the line of action of the gravity, and the shifting and fixed fulcrum systems engage securely with each other at the contact point in order not to slip (the third embodiment and, analogously, the second embodiment). In this case, while inclining, the body is balanced by the fulcrum always moving just below the center of gravity. This is similar to balancing a rod or the like standing on a hand.

In the second case, the body is supported by a plurality of fulcrums and, contrary to the first case, the shifting fulcrum system can slip on the fixed fulcrum system (the fourth, fifth and sixth embodiments). In this case, while the body is inclining, the resultant force of the vertical reactions at the fulcrums balances with the gravity. At each of the moving fulcrums, in general, a roll and a slip occur at the same time.

In each of the cases, the center of gravity is kept at a constant height.

Thus, in the invention, as a body inclines on a fulcrum, and as its center of gravity moves, the fulcrum synchronously moves. During the inclination and movement, the condition of equilibrium and the condition of constancy in potential energy are satisfied, which are the basic prerequisites for solving the task of the invention. It is therefore possible to incline the body with minimum force. In setting fulcrum systems, only the positional relationship between the center of gravity and each of the systems is the question. Apart from a case where the setting is practically restricted, the setting theoretically has no connection with the body shape.

BRIEF DESCRIPTION OF THE DRAWINGS

Preferred embodiments of the present invention will be described in detail with reference to the accompanying drawings, in which:

FIG. 15(a) is a side view of the arrangement of the systems;

FIG. 15(b) is a front view of the fixed fulcrum systems;

FIG. 15(c) shows the fixed fulcrum systems in detail;

DETAILED DESCRIPTION OF THE INVENTION

The first embodiment of the present invention is an inclining book rack, where a body is supported and can incline on a fulcrum. The other embodiments embody the main invention using a combination fulcrum system.

First Embodiment

Figure 1A:
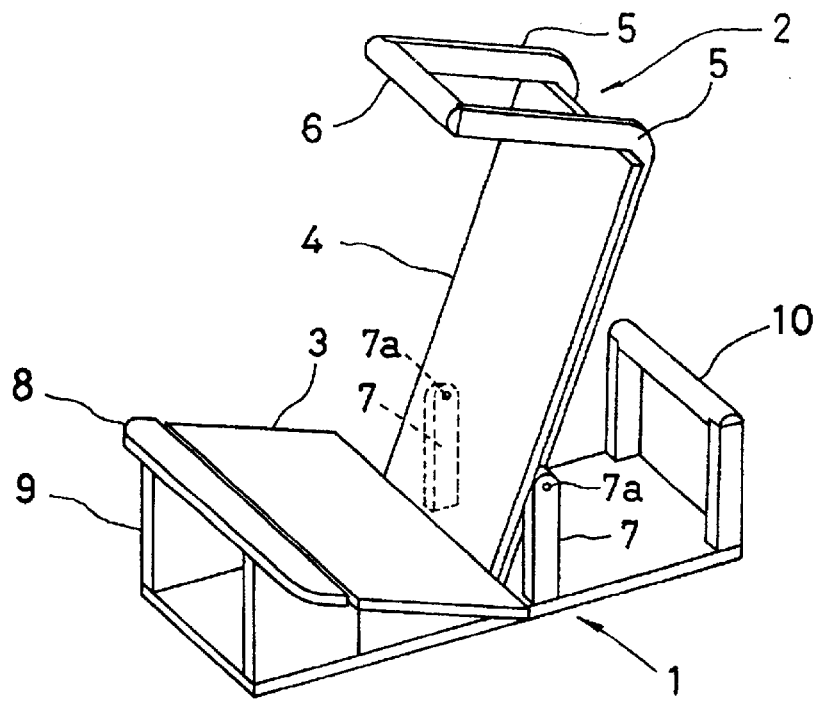
FIG. 1(a) is a perspective view of an inclining book rack of the first embodiment according to a method of turning a body on an axis.
Figure 1B:
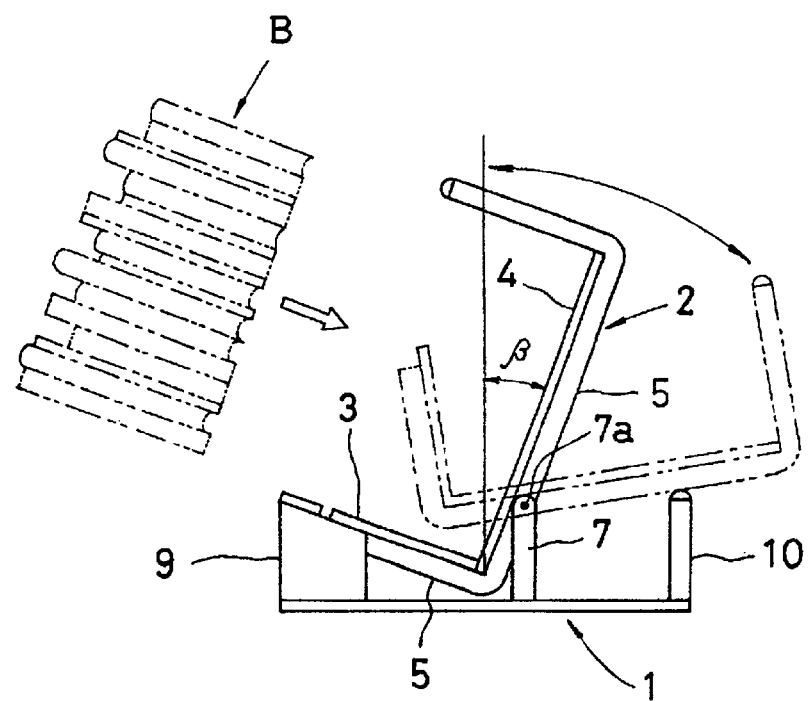
FIG. 1(b) is a side view of the rack shown in FIG. 1(a)

This embodiment is an inclining book rack according to a general inclining method, where a body is supported rotatably. As shown in FIGS. 1(a) and 1(b), the rack includes a base 1 and an inclining book holder 2.

The base 1 includes a horizontal bottom plate, on which stand a pair of front supports 9, a pair of middle supports 7 and a rear support 10. The tops of the front supports 9 slope down rearward. An auxiliary plate 8 is fixed to the tops of the front supports 9 near their front ends.

The inclining holder 2 includes a bottom plate 3 and a back plate 4 at right angles to each other. The plates 3 and 4 are fixed to a pair of frames 5, each of which has a pair of arms at right angles to the middle portion. The upper ends of the frames 5 are joined together by a horizontal handle 6. The frames 5 are each supported pivotably or turnably by a horizontal pin 7a on one of the middle supports 7. The pin 7a is positioned at a quarter from the bottom of the height of the adjacent frame 5.

In the initial condition, as illustrated, the back plate 4 of the inclining holder 2 is inclined at an angle β (FIG. 1(b)) of 20 degrees rearward from a vertical plane. Therefore, it is possible to pile books B stably in the holder 2, and it is easy to incline the holder 2 by manipulating the handle 6. In this condition, the front end of the bottom plate 3 rests on the rear portions of the front supports 9 so that the plates 3 and 8. Books B can be piled up and held on the plates 3 and 8, which are initially flush with each other.

One or more of the books B can be taken out by manipulating the handle 6 rearward and downward to turn the holder 2 to the position shown by the chain lines in FIG. (1b). In this position, the frames 5 rest on the rear support 10. The rear support 10 might have such a height as to horizontally position the back plate 4. In this embodiment, however, the frames 5 can rest on the rear support 10 with the back plate 4 angled at 80 degrees to a vertical plane. It is therefore easy to return the holder 2 to its initial position by manipulating the handle 6. With the holder 2 positioned as shown by the chain lines, the books stand at an angle on the back plate 4, so that one or more of them can be taken out freely. After one or more books are taken out, the holder 2 is turned to its initial position.

It depends on the fulcrum position how conveniently the handle can be manipulated to incline the books in the inclining holder. Therefore, the relationship between the force acting on the handle and the fulcrum position will be examined or studied below.

Figure 2:
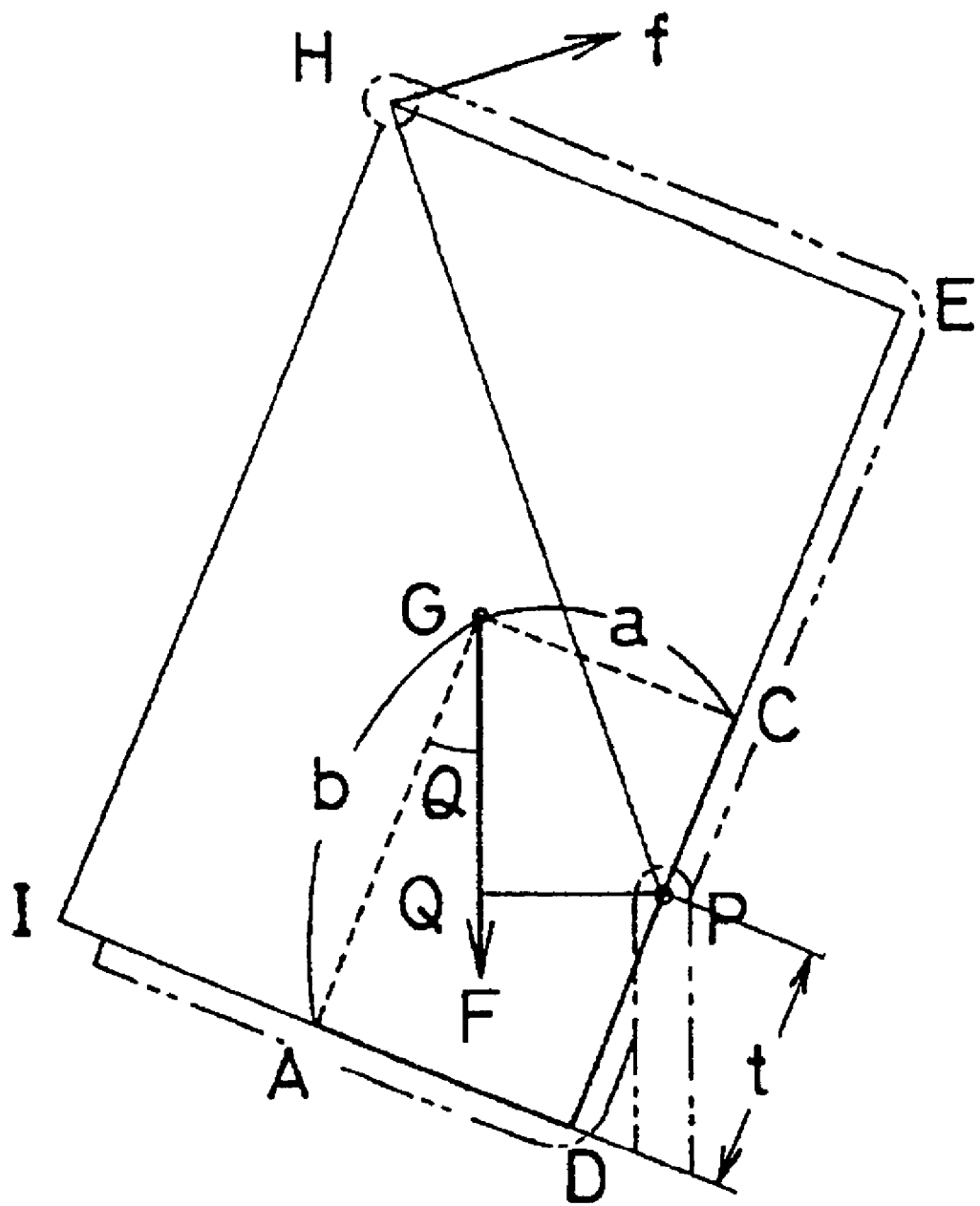
FIG. 2 is a diagram showing the balance between the force acting on the handle of a book holder filled with books and the gravity.

FIG. 2 is a diagrammatic side view of a book holder, which is filled with books and supported turnably on a pair of fulcrums at a point P. The side view is a rectangle with corners H, I, D and E. The holder has a horizontal handle at the corner H. FIG. 2 shows the equilibrium of forces when the holder is inclined by an angle θ clockwise from its vertical position. It is assumed that the rectangle has a center of gravity G at its center. A perpendicular G-C extends between the center G and a point C at a right angle to the longer side E-D of the rectangle. A perpendicular G-A extends between the center G and a point A at a right angle to the shorter side D-I The perpendiculars G-C and G-A have lengths a and b respectively.

It is assumed that the fulcrum P is positioned on the line C-D. "t" is defined as the distance between the points P and D. It is also assumed that the force f acting on the handle point H against gravity F is perpendicular to the line P-H. A perpendicular P-Q extends between the fulcrum P and a point Q at a right angle to the line of action of gravity F. The lines P-Q and P-H have lengths PQ and PH respectively. In consideration of the moment around the fulcrum P, the equilibrium of forces is expressed as follows.

$$f = \frac{PQ}{PH} \cdot F \quad (1.1)$$

where f is defined as a positive when acting in. the pushing direction (clockwise around the fulcrum P in FIG. 2), and as a negative when acting in the pulling direction. In order for its sign to coincide with that of t PQ is defined as a positive when the line of action of gravity F is on the left side of the fulcrum P, and vice versa. PE, EH, AD, DP and AG are defined as the lengths of the lines P-E, E-H, A-D, D-P and G-A respectively. Because of $$PH = \sqrt{PE^2 + EH^2} = \sqrt{(2b-t)^2 + 4a^2} \quad (1.2)$$

$$PQ = AD\cos\theta + DP\sin\theta - AG\sin\theta \quad (1.3)$$

$$= a\cos\theta - (b-t)\sin\theta$$

the force f can be expressed as follows.

$$f = \frac{F\{a\cos\theta - (b-t)\sin\theta\}}{\sqrt{(2b-t)^2 + 4a^2}} \quad (1.4)$$

It is now assumed that the fulcrum P is on the line A-D. "s" is defined as the distance between the points P and D. lakewise, $$PH = \sqrt{(2a-s)^2 + 4b^2} \quad (1.5)$$

$$PQ = (a-s)\cos\theta - b\sin\theta \quad (1.6)$$

$$f = \frac{F\{(a-s)\cos\theta - b\sin\theta\}}{\sqrt{(2a-s)^2 + 4b^2}} \quad (1.7)$$

Figure 3:
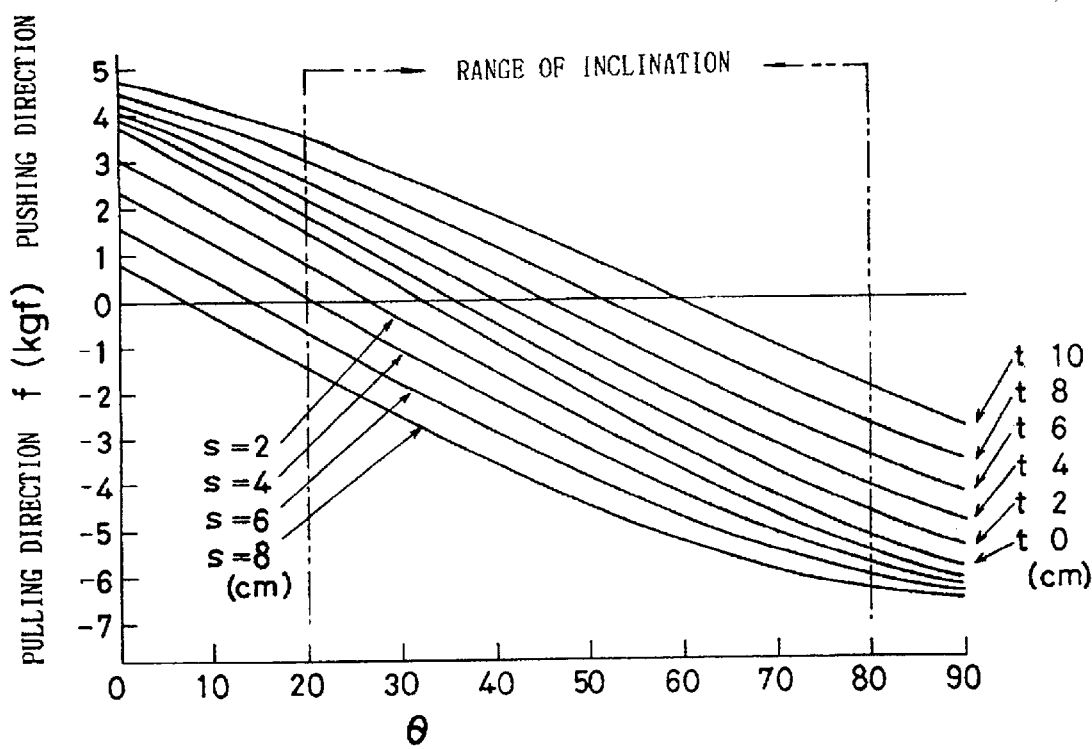
FIG. 3 is a graph showing the relationship between the force acting on the handle and the inclination of the book holder at various fulcrums.

The values f were calculated with the expressions (1.4) and (1.7) for some values t and s. FIG. 3 plots the results of calculation for the values a=10 cm, b=16 cm and F=14 kgf. These values correspond to the holder with size B5 books piled to a height of 32 cm. In FIG. 3, the axis of ordinates represents the force f acting on the handle, and the axis of abscissas represents the holder inclination θ.

The inclination of the book holder 2 of the first embodiment ranges between 20 and 80 degrees. It is therefore found suitable from FIG. 3 to support the holder 2 at the distance t=8 cm, that is, at a quarter from the bottom of the height of the holder in order for the force f to be 3 or less kgf.

The book holder 2 has no lateral side walls, and its fulcrums P are each between the points C and D on one of the frames 5. Otherwise, the holder 2 might have side walls and be supported near its center of gravity G. In such a case, however, the book rack would be wider to cover the ends of books. As a result, the rack would need a larger space and be inconvenient to use.

Second Embodiment

The second embodiment will be described with reference to FIGS. 4 through 7.

It is also found from FIG. 3 that, when f=0, the inclination θ increases as the fulcrum position shifts in the order of s=8→s=6→ . . . →t=10. This means that, under proper conditions, it is possible to incline the book holder with slight force by shifting the fulcrum P in FIG. 2 from A via D toward C (A→D→C). Graphically, in FIG. 3, this shift corresponds to a 4=series of jumps along the line of f=0. Such jumps may be realized by two shifting fulcrum systems and a fixed fulcrum system. The shifting fulcrum systems each include a number of horizontal shafts arranged in parallel on one of the lines A-D and D-C. The fixed fulcrum system includes recesses formed in a base to receive the shafts. As the book holder inclines, the shafts engage in order with the recesses to make up fulcrums in succession It will be discussed below what shape should be taken by the fixed fulcrum system.

If the fulcrum P is fixed, the force f is zero (f=0) when the line of action of gravity F extends through the fulcrum P (PQ=0), as apparent from the expression (1.1) of the first embodiment and FIG. 2. This is a condition of equilibrium. As stated above, in order to incline the book holder with minimum force while shifting the fulcrum P, it is further necessary to keep the center of gravity G at a constant height. This is a condition of constancy in potential energy. It is therefore necessary for the required fulcrum system to substantially satisfy the two conditions. Such a fulcrum system can be determined by a drawing method as explained below.

Figure 4A:
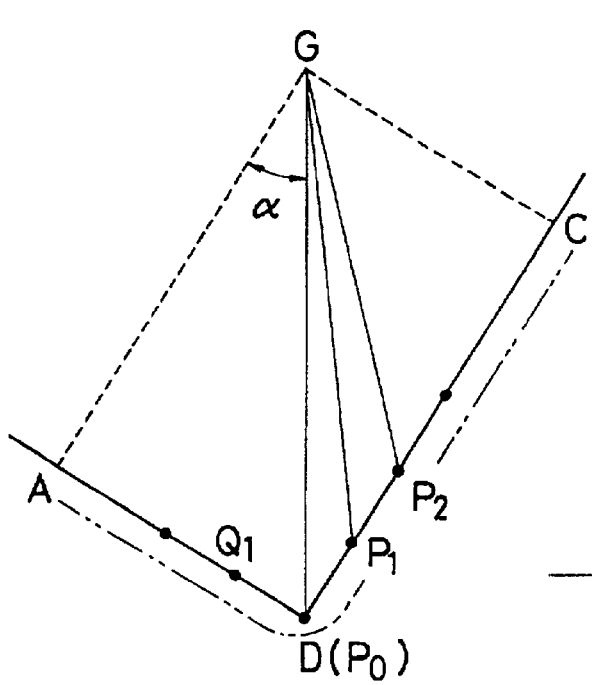
FIGS. 4(a) and 4(b) show how to diagram the fulcrum systems of a book holder according to the second embodiment.
Figure 4B:
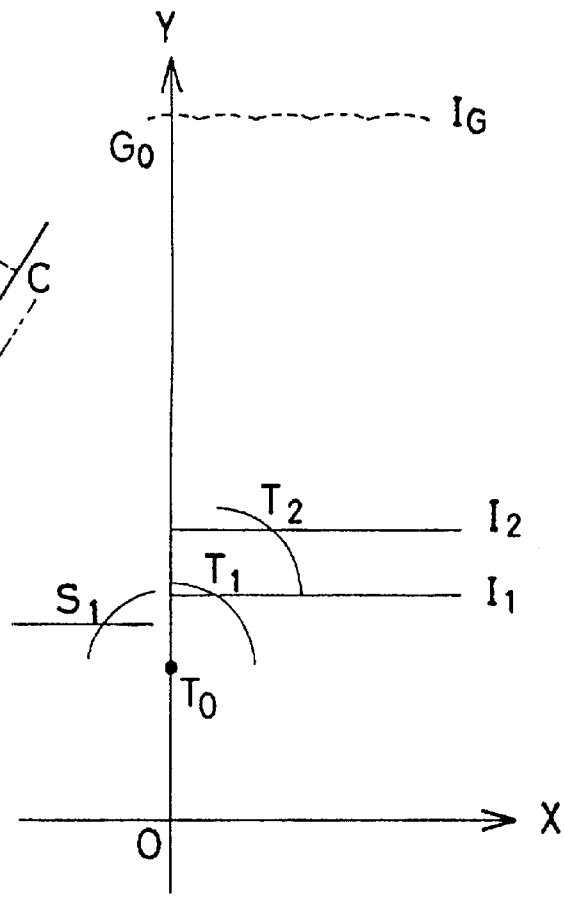

As shown in FIG. 4(a), horizontal shafts D (=$P_0$), $P_1$, $P_2$, etc. as a shifting fulcrum system are arranged at intervals on the peripheral portion D-C of a book holder. When the holder is inclined at an angle α, the shaft D is positioned just below the center of gravity G. It is assumed that, at this position, the shaft D engages with the associated recess of a fixed fulcrum system, at a point $T_0$ on the y-axis of an x-y coordinate system as shown in FIG. 4(b). As the holder. further inclines, the shafts $P_1$, $P_2$, etc. engage in order with the associated recesses of the fixed fulcrum system. Consequently, the holder turns little by little on the spaced fulcrums. In FIG. 4(b), as the holder filled with books turns, its center of gravity G describes a series of small circular arcs IG, which extends through a point $G_0$ on the y-axis. The radii of the arcs are the distances CD (=$GP_0$), $GP_1$, $GP_2$, etc. between the center of gravity and the respective shafts. Accordingly, in order to keep the center of gravity G at a nearly constant height, it is necessary for the slum of each of the radii and the height of the associated recess of the fixed fulcrum system to equal the distance $G_0O$ in FIG. 4(b). Therefore, in FIG. 4(b), the y-coordinates of the fixed fulcrum system are determined by drawing straight lines $l_1$, $l_2$, etc. in parallel with the x-axis and at heights $G_0O-GP_1$, $G_0O-GP_2$, etc. respectively. Now, the following definitons are given:

the height of the center of gravity G is r (=$G_0O$);
the height of the point To on the y-axis is c (=$T_0O$);
the length of the perpendicular between the center of gravity G and the shifting fulcrum system is h (=GC);
the distance between the point D (=$P_0$) and the "k" th fulcrum shaft $P_k$ is $t_k$;
the distance DC is d (DC=d).

Then, the y-coordinate $y_k$ for the "k"th fulcrum $T_k$ of the fixed fulcrum system is expressed as follows.

$$y_k = G_0 O - GP_k = r - \sqrt{h^2 + (d-t_k)^2} \qquad (2.1)$$

where $$d = \sqrt{(r-c)^2 - h^2}.$$

When the book holder turns on one of the shafts as a fulcrum, each of the next shafts describes a circular arc with a radius equal to the distance between it and the fulcrum. When the holder turns on the shaft D at the point $T_0$ on the y-axis, the shaft $P_1$ describes an arc with a radius $DP_1$ around this point. This arc intersects with the horizontal line $l_1$ at a point $T_1$. When the holder turns on the shaft $P_1$ at $T_1$, the shaft $P_2$ describes an arc with a radius $P_1P_2$. This arc intersects with the line $l_2$ at a point $T_2$. By repeating this for a number of fulcrums, it is possible to shape the fixed fulcrum system.

This applies likewise to the shafts between the points A and D. In this case, however, the recesses $S_1$, $S_2$, eta of the fixed fulcrum system are plotted on the minus side of the x-axis in accordance with the shafts $Q_1$, $Q_2$, etc. respectively.

Figure 5:
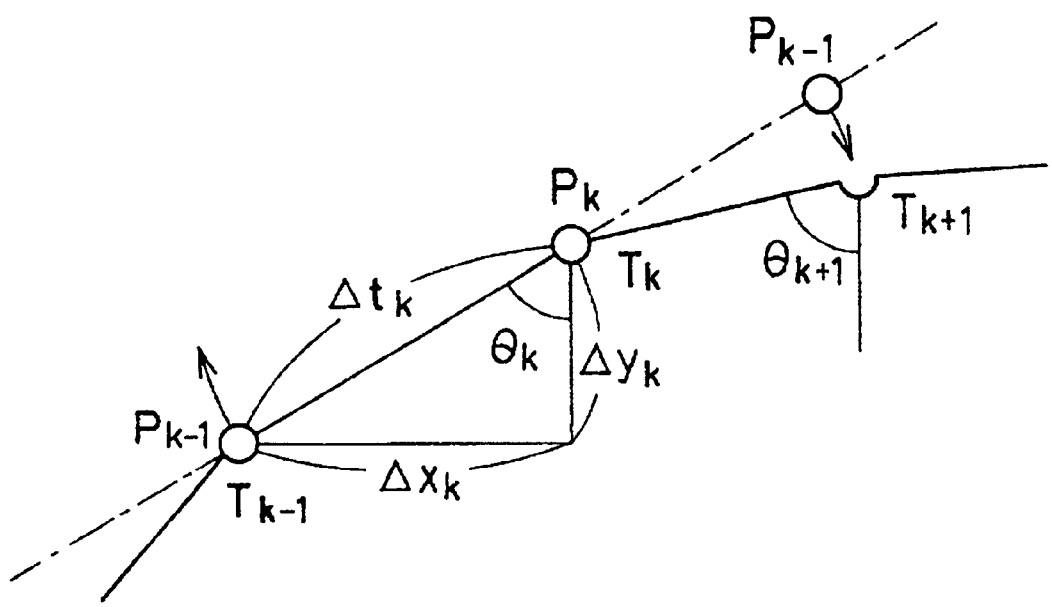
FIG. 5 shows fulcrums being made up of shafts of a shifting fulcrum system and recesses of a fixed fulcrum system.

FIG. 5 shows the "k"th shaft $P_k$ of the shifting fulcrum system between the points D and C engaging with the associated recess $T_k$ of the fixed fulcrum system to make up a fulcrum. As apparent from the draw method explained above, the coordinate $x_k$ for the "k"th fulcrum $T_k$ of the fixed fulcrum system is expressed as follows.

$$x_k = \pm \sum_{i=1}^{k} \Delta x_i = \pm \sum_{i=1}^{k} \sqrt{(t_i - t_{i-1})^2 - (y_i - y_{i-1})^2} \qquad (2.2)$$

The above expressions represent the coordinates of the fixed fulcrum system, which consists of discontinuous fulcrums. In particle, if the intervals between the shafts of the shifting fulcrum system are regular ($t_i - t_{i-1} = \Delta t$), then $t_k = k\Delta t$. In this case, the expressions (2.1) and (2.2) are as follows.

$$x_k = \pm \sum_{i=1}^{k} \sqrt{\Delta t^2 - (y_i - y_{i-1})^2} \qquad (2.3)$$

where $$d = \sqrt{(r-c)^2 - h^2}.$$

In order to find out a rough value of the force required to incline the book holder, for the fulcrum system thus determined, the relationship between the force f acting on the handle and the holder inclination $\theta$ will be found, as shown in FIG. 3 of the first embodiment. In FIG. 5, the holder inclination $\theta$ at the moment when the shaft $P_k$ has engaged with the recess $T_k$ is $\theta_k$. Therefore, while a fulcrum is made up at $T_k$ (during this time, $t=t_k$), the range of $\theta$ is as follows.

$$\theta_k \leq \theta \leq \theta_{k+1} \qquad (2.4)$$

As apparent from FIG. 5, $$\theta_k = \cos^{-1}\left(\frac{\Delta y_k}{\Delta t_k}\right) = \cos^{-1}\left(\frac{y_k - y_{k-1}}{t_k - t_{k-1}}\right). \qquad (2.5)$$

Therefore, if the number of fulcrums of this fulcrum system is n in total, the f-$\theta$ relationship for the fulcrum system is found by substituting the value $t=t_k$ (k=1, 2, . . . n) into the expression (1.4) of the first embodiment in the range of inclinations expressed by the expressions (2.4) and (2.5). In the expression (1.4), however, a and b are replaced by h and d respectively (a=h, b=d).

Likewise, for the shafts $Q_1$, $Q_2$, etc. between the points A and D, while a fulcrum is made up on the "j"th recess $S_j$ as counted from the origin O of the fixed fulcrum system (during this time, $t=t_j$), the range of $\theta$ is as follows.

$$\theta_{j+1} \leq \theta \leq \theta_j \qquad (2.6)$$

where $$\theta_j = \sin^{-1}\left(\frac{\Delta y_j}{\Delta t_j}\right) = \sin^{-1}\left(\frac{y_j - y_{j-1}}{t_j - t_{j-1}}\right). \qquad (2.7)$$

Therefore, if the number of fulcrums of this fulcrum system is m in total, the f-$\theta$ relationship for the fulcrum system is found by substituting the value $s=t_j$ (j=1, 2, . . . m) into the expression (1.7) of the first embodiment in the range of inclinations expressed by the expressions (2.6) and (2.7). In the expression (1.7), however, a and b are replaced by d and h respectively (a=d, b=h). While a fulcrum is made up at the origin O, the range of $\theta$ is as follows.

$$\theta_{j-1} \leq \theta \leq \theta_{k-1} \qquad (2.8)$$

During this time, because of s =t =0, the expressions (1.4) and (1.7) equal each other.

Figure 6:
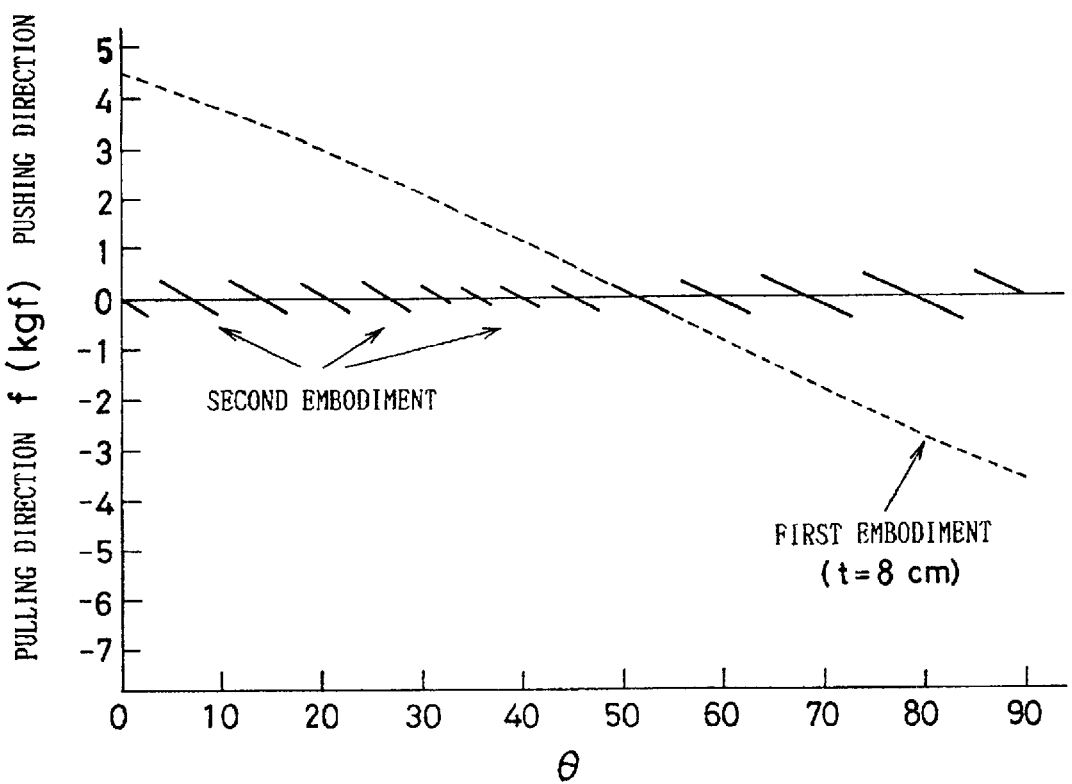
FIG. 6 is a graph showing the relationship between the force acting on the holder handle of a book rack to which the invention is applied and the holder inclination.

FIG. 6 shows the results of calculation of the f-$\theta$ relationship for an actual fulcrum system under the following conditions (with the values for a, b and F equal to those for the first embodiment): $\Delta t=2$ cm (regular intervals), m=5, n=8. As shown in FIG. 6, the results are discontinuous curves crossing the line at f=0. For comparison, the dotted line represents the first embodiment under the optimum conditions (t=8 cm). As apparent from FIG. 6, by applying the fulcrum system determined through the above method, it is possible to incline with a small force of 0.5 or less kgf the book holder filled with books.

For convenience sake, as shown in FIG. 4(a), the shifting fulcrum systems with a shaft at the point D have been explained above. The point D describes the largest circular arc when the book holder inclines. In addition, the point D is where the directions of the shifting fulcrum systems between A and D and between D and C change. Consequently, the point D moves in the vicinity of the recesses $T_1$ and $S_1$ of the fixed fulcrum system, which are associated with the shafts adjacent to this point. It is therefore difficult to form these recesses as part of a fixed fulcrum system, so there should preferably be no shaft at the point D. In this case, the fixed fulcrum system has no recess at the origin, which is associated with the point D. In addition, the T or S series of recesses are translated in parallel with the x-axis, and adjusted so that the two series approach each other for $S_1T_1=Q_1P_1$. This prevents interference between a shaft and a recess which are not associated with each other.

The book holder described above includes shifting fulcrum systems along its periphery, where the lines A-D and D-C are perpendicular to each other.

As apparent from the drawing method explained with FIG. 4, there is no need for the angle between the shifting fulcrum systems to be right. In general, for a given angle (=∠ADC) on both sides of the center of gravity G, the equations (2.1) and (2.2) or equation (2.3) of the fixed fulcrum system is established.

Figure 7:
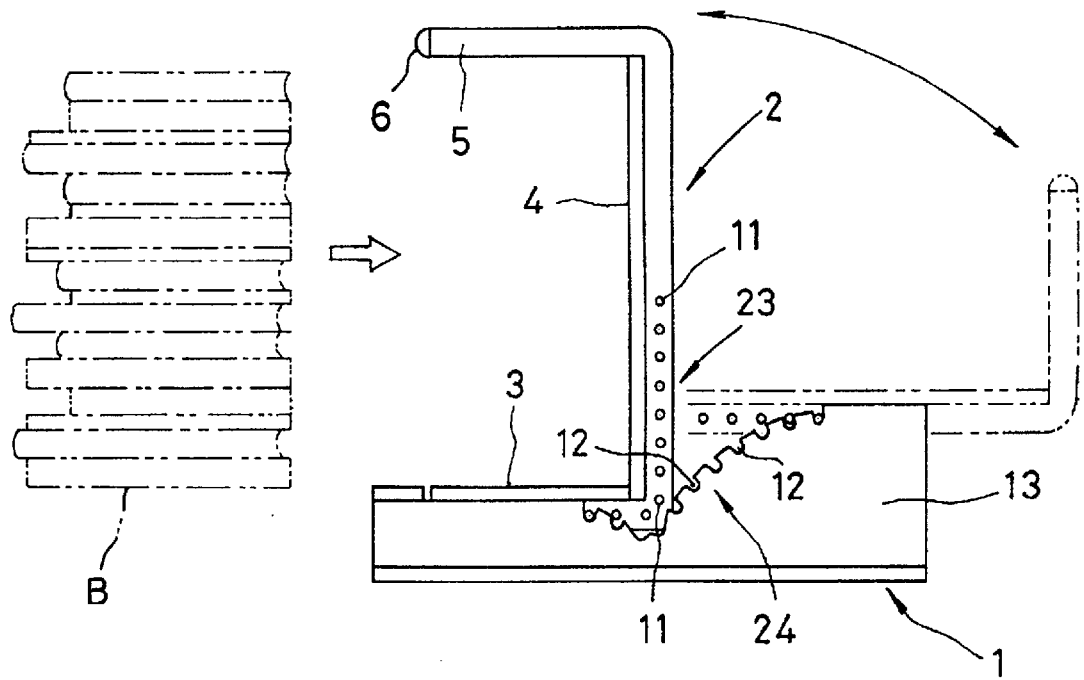
FIG. 7 is a side view of a book rack according to the second embodiment, to which the fulcrum systems of the invention are applied.

FIG. 7 shows a book rack according to this embodiment based on the above study and/or consideration. The rack consists of a base 1 and a book holder 2. The holder 2 includes a pair of U-shaped frames 5. Each of the frames 5 has a number of horizontal pins 11 fixed to it at intervals and protruding outward (right or left in a front or rear view). The pins 11 make up a shining fulcrum system 23. The base 1 includes a pair of supporting side walls 13. Each of the walls 13 has recesses 12 positioned by the above method to receive the pins 11 on the adjacent frame 5. The recesses 12 make up a fixed fulcrum system 24. The first fulcrum at the left end in FIG. 7 is positioned a little nearer to the point D in FIG. 4(a) than the position corresponding to the point A This is done so that the holder 2 resists a little when pushed to incline, because the books in the holder need holding stably. When the handle 6 is pushed or pulled, the holder 2 inclines with the shifting fulcrum system 23 at its bottom and back engaging with the fixed fulcrum system 24 of the base 1.

Third Embodiment

Figure 8:
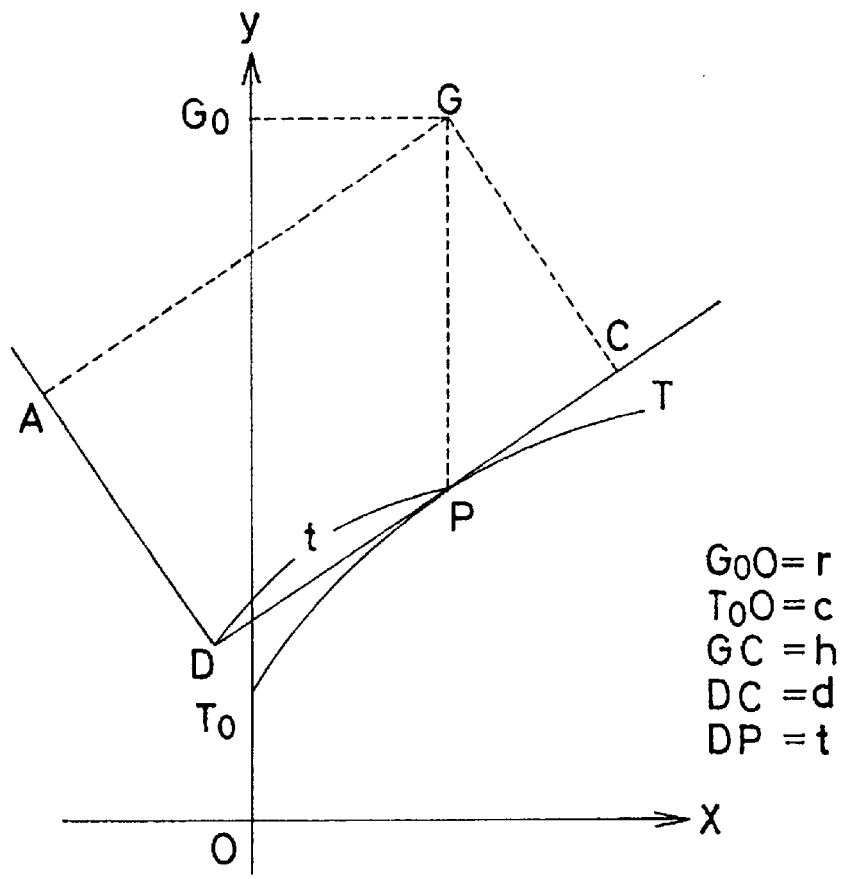
FIG. 8 is a diagram of the third embodiment, where fulcrum systems are made up of series of recesses and protrusions for mutual engagement.
Figure 9:
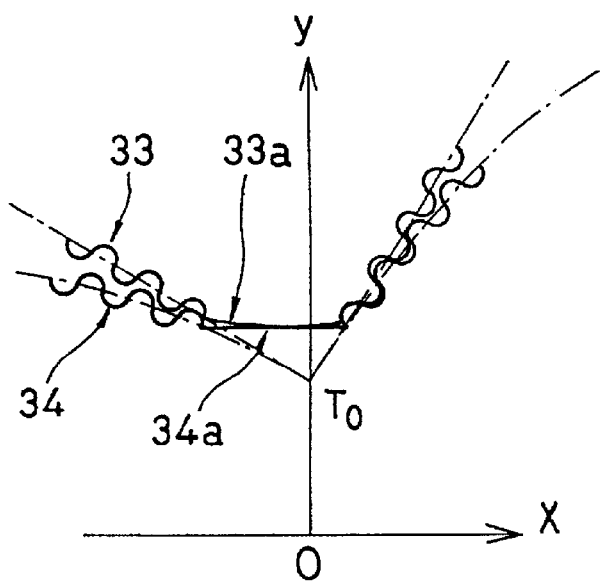
FIG. 9 shows fulcrum systems according to the third embodiment, which comprise series of recesses and protrusions for mutual engagement.

FIGS. 8 and 9 show the third embodiment.

The fulcrum systems of the second embodiment are a combination of spaced shafts or pins and recesses. Therefore, when the book holder of the second embodiment inclines, its center of gravity moves up and down slightly, so that the holder may not smoothly move. If the fulcrum systems were continuous or serial protrusions and recesses for mutual engagement, the holder could move more smoothly. The basis for the correlation between the shafts and recesses is pitch lines. It is possible to accurately determine the shape of the fixed fulcrum system by considering that the pitch line of each of the shifting fulcrum systems moves, without slipping, on the pitch line of the fixed system, as the tangential angle varies. In this case, the fixed fulcrum system curve is the envelope on the shifting fulcrum systems A-D and D-C.

FIG. 8 shows the shifting fulcrum system pitch line D-C being tangent to the fixed fulcrum system pitch arc $T_0$-T at a point P. Here, in order to show the equation of the fixed fulcrum system in general form, it is assumed that ∠ADC is not limited to a right angle, but may be any angle. It is also assumed that the shifting fulcrum systems may have a negative inclination like A-D does when the intersection D of the shifting fulcrum systems is positioned at the point $T_0$. Therefore, similarly to the second embodiment, the following definitions are given:

the center of gravity G has a height r;
the point $T_0$ on the y-axis has a height c;
the perpendicular between the center of gravity G and each of the shifting fulcrum systems has a length h;
the distance between the foot of this perpendicular and the intersection D of the shifting fulcrum systems is d;
the distance between the intersection D and the tangent point P is t.

Consequently, for the fulcrum system D-C, GC=h and DC=d, while for the fulcrum system A-D, GA=h and AD=d.

When the point of contact P is located at the point $T_0$, the point D is at the point $T_0$ as well, and the center of gravity G is at the point $G_0$ on the y-axis. The arc $T_0$-T is a locus described by the point of contact P. Therefore, if DP=t, this arc can be represented by a curve of which the parameter is t. If the equations of the curve are x=x(t) and y=y(t), y needs to be $$y = G_0O - GP = r - \sqrt{h^2 + (d-t)^2} \quad d = \sqrt{(r-c)^2 - h^2} \quad (3.1)$$

under the conditions that the center of gravity is kept at a constant height, and that the point of contact P is located on the line of action, as explained with regard to the second embodiment.

Under the condition that the pitch lines contact without slipping, the length of the arc $T_0$-P is DP=t ($T_0$P=DP=t). Therefore, by applying to the arc $T_0$P a formula for the length of a curve, the following is established.

$$\int_0^t \sqrt{\left(\frac{dx}{dt}\right)^2 + \left(\frac{dy}{dt}\right)^2}\, dt = t \quad (3.2)$$

If both sides of this expression are differentiated, then $$\sqrt{\left(\frac{dx}{dt}\right)^2 + \left(\frac{dy}{dt}\right)^2} = 1. \quad (3.3)$$

On the other hand, from the expression (3.1), $$\frac{dy}{dt} = \frac{d-t}{\sqrt{h^2 + (d-t)^2}}. \quad (3.4)$$

If this is substituted into the expression (3.3), then $$\frac{dx}{dt} = \frac{\pm h}{\sqrt{h^2 + (d-t)^2}}. \quad (3.5)$$

If this expression is integrated, then $$x = \pm h \log \frac{d+r-c}{d-t+\sqrt{h^2+(d-t)^2}}. \quad (3.6)$$

Here, the integration constant is determined as x(O)=0. As stated above, the equations of the fixed fulcrum system pitch line are expressed by the expressions (3.6) and (3.1) of which the parameter is t. The sign, which is positive or negative, of the expression (3.6) coincides with that of the inclination of each of the shifting fulcrum systems when the center of gravity G is positioned on the y-axis.

In this embodiment, the center of gravity G is always positioned just above the fulcrum P, and merely moves in parallel with the x-axis as the book holder inclines. Therefore, the two conditions of equilibrium and constancy in potential energy are satisfied completely. Assuming that the shifting fulcrum systems A-D and D-C in FIG. 8 form part of the periphery of a rectangular body, and considering the symmetry of the body, it is apparent that the same applies to the other corners. Consequently, on the fulcrum systems thus constructed or arranged, the rectangular body may be shifted smoothly like a wheel rolls on a plane.

When the fulcrum shifts on the fixed fulcrum system determined by the equations (3.6) and (3.1), as the shifting fulcrum systems engage with the fixed system, the pitch line direction changes at the point $T_0$ on the y-axis. As a result, the recesses and protrusions interfere. As shown in FIG. 9, this portion of the shifting fulcrum systems 33 is replaced by a very small arc 33a of a circle having a radius equal to the distance between the arc and the center of gravity G. The associated portion of the fixed fulcrum systems 34 is replaced by a horizontal line 34a. The combination of the arc, which keeps the height of the center of gravity, and the horizontal line apparently satisfies the conditions for the fulcrum systems of the present invention. Therefore, the fulcrum can smoothly shift or move near the y-axis as well.

In this and the second embodiments, it is assumed that the center of gravity G is located at the center of a rectangular body. For example, however, if the present invention is applied to a book rack, the center of gravity of the book holder is usually located lower than is assumed, because the holder is not always filled with books. In such a case, a small load is applied to the holder inclination, because the center of gravity of the holder is located always on the left side, where the inclination is O, of the fulcrum. Instead, advantageously, the book holder returns automatically to its initial position, if freed form a hand after books are taken out. In this case, the book holder returns relatively gently, because the fulcrum moves as if to follow the center of gravity.

FIGS. 10 through 17 show the second inclining method of the present invention.

Fourth Embodiment

Figure 10A:
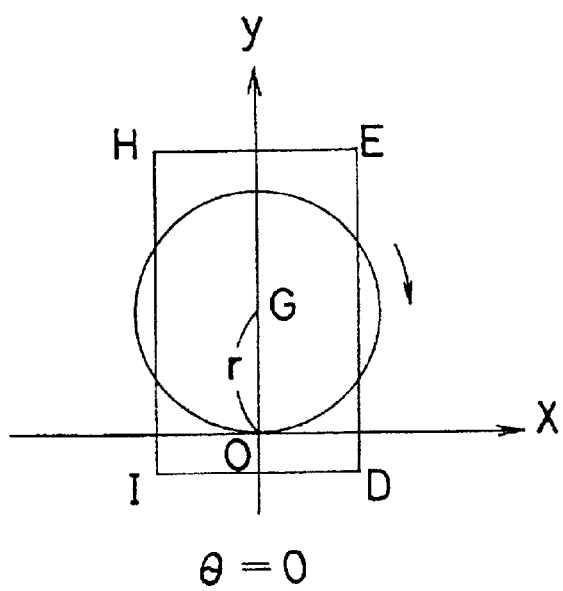
FIGS. 10(a) and 10(b) the fourth embodiment, which belongs in the second inclining method.
Figure 10B:
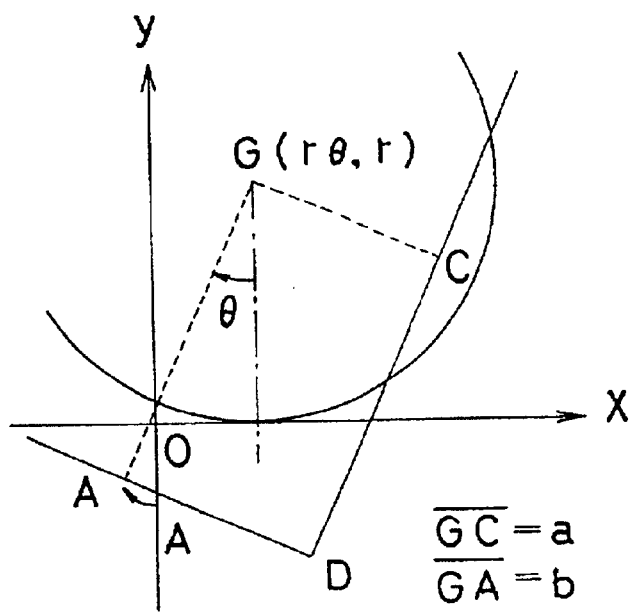
Figure 11:
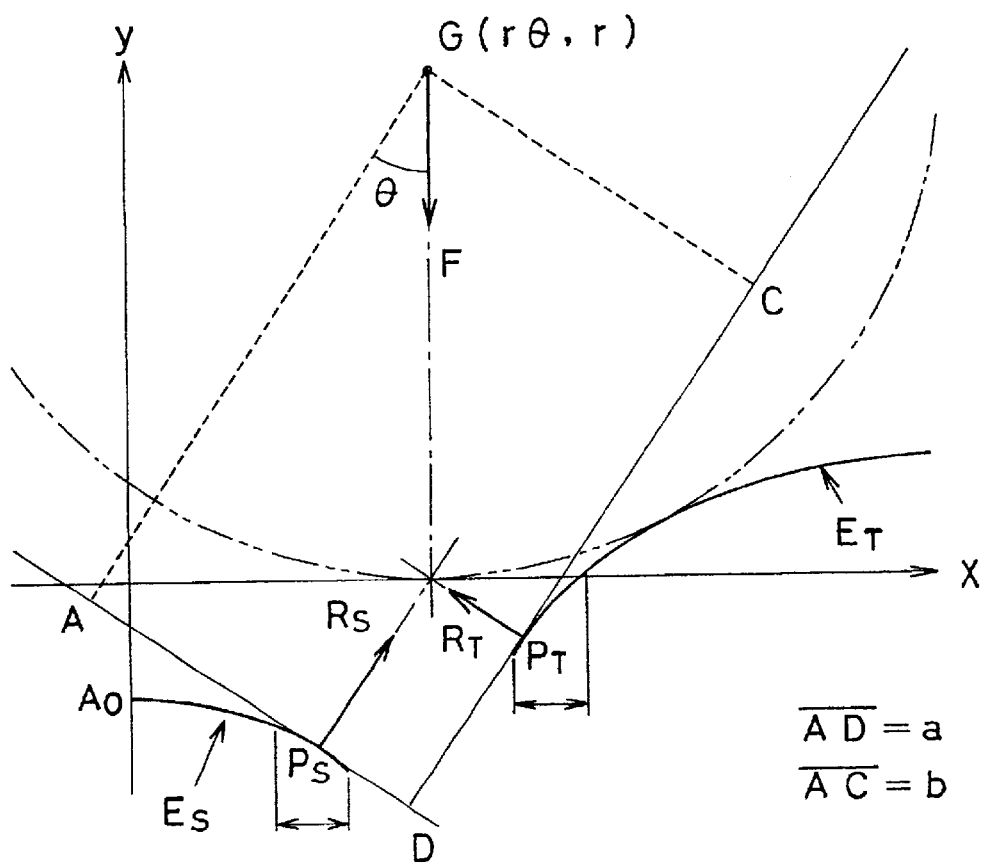
FIG. 11 is a diagram showing the equilibrium of forces in the second case of the invention.

FIGS. 10 and 11 show the fourth embodiment.

As shown in FIG. 10(a), a circle is assumed which is fixed to a rectangular body H-I-D-E. The circle has a radius r, and its center is located at the center of gravity G of the body. It is assumed that, in an x-y coordinate system, the circle rolls without slipping on the x-axis from the origin O. FIG. 10(b) shows the circle having rolled so that the rectangular body has an inclination $\theta$. If the rectangular body has inclined as shown in FIG. 10(b), at least the condition of constancy in potential energy is satisfied.

The fixed fulcrum system pitch line determined in the third embodiment is the envelope for a group of straight lines, on which the shifting fulcrum system pitch lines move as they vary their angles. Therefore, also in the movement of the rectangular body assumed in FIG. 10(b), an envelope can be imagined for the group of straight lines described by the straight lines A-D and D-C, which are shifting fulcrum systems. In this embodiment, the equations of the envelope will be found, and it will be explained that the envelope can be a fixed fulcrum system, similarly to the third embodiment. For this reason, the equations of the lines A-D and D-C in this coordinate system will be found first.

In FIG. 10(b), similarly to the first embodiment, perpendiculars G-C and G-A extend between the center of gravity G and two sides of the rectangular body, and have lengths a and b respectively. At the inclination $\theta$, the coordinates of the center of gravity G are $r\theta$ and r ($r\theta$, r). The point A moves from its initial position $A_0$ (O, r-b), describing a trochoid curve. The coordinates of the point A at the inclination $\theta$ are expressed as follows.

$$x = r\theta - b \sin \theta, y = r - b \cos \theta \quad (4.1)$$

Consequently, because the straight line A-D extends through the point A, and because its inclination is $-\tan \theta$, its equations are as follows.

$$y - (r - b \cos \theta) = -\tan \theta \{x - (r\theta - b \sin \theta)\} \quad (4.2)$$

At this inclination, because the point D is located at the distance a from the point A on the straight line, its coordinates are as follows.

$$x = r\theta - b \sin \theta + a \cos \theta, y = r - b \cos \theta - a \sin \theta \quad (4.3)$$

Because the straight line D-C perpendicular to the line A-D has an inclination $\cot \theta$, its equations are expressed as follows.

$$y - (r - b \cos \theta - a \sin \theta) = \cot \theta \{x - (r\theta - b \sin \theta + a \cos \theta)\} \quad (4.4)$$

In an x-y plane, a group of curves is expressed by the following equation:

$$g(x, y, \theta) = \quad (4.5)$$

which contains the parameter $\theta$. It is assumed that the equation (4.5) partially differentiated with respect to $\theta$ for the group of curves is the following equation.

$$g_\theta(x, y, \theta) = 0 \quad (4.6)$$

Then, by solving the equations (4.5) and (4.6), the equations of the envelope on the group of curves expressed by the equation (4.5) can generally be expressed as an intersection of these equations in the following form.

$$x = \phi(\theta), y = \psi(\theta) \quad (4.7)$$

(for example, Teiji Takagi "KAISEKI GAIRON", page 318, Iwanami Shoten).

By applying this theory to the equation (4.2), which is a group of straight lines, or a group of curves having no curvature, the envelope $E_S$ of the straight line A-D is determined as $$x = r\theta + (r \cos \theta - b) \sin \theta, y = (r \cos \theta - b) \cos \theta. \quad (4.8)$$

Likewise, from the equation (4.4), the envelope $E_T$ of the straight line D-C is $$x = r\theta - (r \sin \theta - a) \cos \theta, y = (r \sin \theta - a) \sin \theta. \quad (4.9)$$

An envelope is a locus of contacts with a group of curves. The expressions (4.8) and (4.9) directly express the coordinates of contacts at the inclination $\theta$. As apparent immediately at first sight from these x-coordinate expressions, the contact points (i.e., fulcrums) of the straight lines A-D and D-C and the envelopes do not exist on the line of action ($x = r\theta$). Therefore, with an idea similar to the ideas in the second and third embodiments, these envelopes seem to lack the condition of equilibrium necessary to use them as fixed fulcrum systems. On examination in more detail, however, interesting relationships as stated below between the two envelopes are found.

At its given inclination $\theta$, as shown in FIG. 11, the rectangular body H-I-D-E contacts with the envelopes $E_S$ and $E_T$ at the same time at two points $P_S$ and $P_T$ respectively. Under the condition that the normal to the envelope $E_S$ extends through the coordinate point $P_S$ of the equation (4.8) and is perpendicular to the straight line A-D, its equation is expressed as follows.

$$y = \cot \theta \cdot (x - r\theta) \quad (4.10)$$

Likewise, because the normal to the envelope $E_T$ extends through the coordinate point $P_T$ of the equation (4.9) and is perpendicular to the straight line D-C, its equation is as follows.

$$y = -\tan \theta \cdot (x - r\theta) \quad (4.11)$$

Both of the equations (4.10) and (4.11) satisfy $x = r\theta$ and $y = 0$. That is to say, the normals intersect on the line of action of the gravity. The point of intersection is also a point of contact between the x-axis and the virtual circle of the radius r, which rolls on the x-axis.

With the envelopes determined as a result of the roll of the virtual circle, the rectangular body is substantially subjected to the reactions $R_S$ and $R_T$ against the gravity F of the body at the points $P_S$ and $P_T$ respectively. As the body inclines, the lines A-D and D-C move their contact points while slipping on the envelopes $E_S$ and $E_T$ respectively.

In order to show that the rectangular body is always in equilibrium in the process stated above, virtual displacement relative to this dynamic system will now be imagined. Without friction at the contact points under ideal conditions, the reactions $R_S$ and $R_T$ act perpendicularly to the envelopes $E_S$ and $E_T$ respectively, and their directions coincide with those of the normals of the expressions (4.10) and (4.11). On the other hand, because the body slips at the contact points in the tangential directions, the direction of the virtual displacement is perpendicular to the directions of the reactions. In such a case, the reactions $R_S$ and $R_T$ constrain the movement of the rectangular body, and can therefore be regarded as forces of constraint. This constraint is always perpendicular at the contact points, and therefore dynamically smooth constraint. Therefore, the works of the forces of constraint $R_S$ and $R_T$ on the virtual displacement at the contact points $P_S$ and $P_T$ respectively are zero. On the other hand, the gravity F on the body is perpendicular ($F_x$=0) to the virtual displacement $\delta x_G$ (=$r\delta\theta$) of the center of gravity G along the x-axis, and the virtual displacement of the center of gravity G along the y-axis is $\delta y_G$=0. Therefore, the virtual work in this dynamic system is eventually as follows.

$$\delta W = F_x \delta x_G + F_y \delta y_G = 0$$

where $F_x$ and $F_y$ are the x- and y-components respectively of the gravity F. Therefore, from the principle of virtual work, it can be said that the dynamic system is in complete equilibrium. This equilibrium is reached at any angle. In addition, as assumed at the beginning of this embodiment, the condition of constancy in potential energy is satisfied That is to say, the two conditions for solving the problems are satisfied, which were stated with regard to the operation of the present invention. Therefore, with the lines A-D and D-C being shifting fulcrum systems, and with the envelopes $E_S$ and $E_T$ being fixed fulcrum systems, it is possible to incline the rectangular body H-I-D-E with slight force (only the frictional forces at the contact points), if the frictions at the contact points (fulcrums) are sufficiently low.

With reference to FIG. 11, actually, the signs of the curvatures of the envelopes $E_S$ and $E_T$ are reverse at the right and left ends respectively of the envelopes. Then, the envelopes curve backward and form downward convex curves. In FIG. 11, however, only the upwardly convex ranges are shown. In the expressions (4.8) and (4.9), these ranges are determined under the following condition.

$$\frac{d^2 y}{dx^2} = \frac{\frac{d}{d\theta}\left(\frac{dy}{d\theta} / \frac{dx}{d\theta}\right)}{\frac{dx}{d\theta}} \leq 0$$

The results in a range of $0 \leq \theta \leq \pi/2$ are as follows.

$$\cos\theta \geq b/2r \quad \text{(envelope } E_S\text{)} \tag{4.12a}$$

$$\sin\theta \geq a/2r \quad \text{(envelope } E_T\text{)} \tag{4.12b}$$

In the range $0 \leq \theta \leq \pi/2$, $\cos\theta$ is a decreasing function and $\sin\theta$ is an increasing function. Therefore, both shifting fulcrum systems A-D and D-C contact with the convex portions of the envelopes at the same time in the following range.

$$\sin^{-1}(a/2r) \leq \theta \leq \cos^{-1}(b/2r) \tag{4.13}$$

In FIG. 11, this range corresponds to the portions of the envelopes $E_S$ and $E_T$ indicated by the arrows. Thus, only small portions of the envelopes $E_S$ and $E_T$ are used and the angle is limited to a narrow range, since the peripheries A-D and D-C of the rectangular body H-I-D-E are determined as shifting fulcrum systems when fulcrum systems are set, but this is practically not very useful. As shown in the next (fifth) embodiment, however, it is possible to incline a body in a wider range of angles by setting shifting fulcrum systems freely and properly without being restricted by the body shape. Expressions more generalized for that purpose will be shown below.

First, as shown in FIG. 10(a), the center of gravity G is located on the y-axis in the initial condition (inclination $\theta$=0). In this condition, the straight line (not shown) is imagined which extends through the point D (a, r-b) at the distance a along the x-axis and at the distance -b along the y-axis from the center of gravity G, and at an angle $\Delta$ with and clockwise from the minus side of the x-axis. When the body inclines by the angle $\theta$, the inclination of this line is $-\tan(\theta+\Delta)$. Because the point D is positioned at the coordinates of the expressions (4.3), the equation of the line is as follows.

$$y-(r-b\cos\theta-a\sin\theta)=-\tan(\theta+\Delta)\cdot\{x-(r\theta-b\sin\theta+a\cos\theta)\} \tag{4.14}$$

In the initial condition of $\theta$=0, it is possible to designate or specify any straight line by freely selecting the values a, b and $\Delta$ with the constant valuer in this expression. Therefore, this expression can be a general expression of the shifting fulcrum systems (precisely, of straight lines containing the shifting fulcrum systems).

Second, the above envelope equations can be determined similarly to the previous manner, and organized with an/the addition theorem as follows.

$$x = r\theta + \{r\cos(\theta+\Delta) + a\sin\Delta - b\cos\Delta\}\sin(\theta+\Delta)$$

$$y = \{r\cos(\theta+\Delta) + a\sin\Delta - b\cos\Delta\}\cos(\theta+\Delta) \tag{4.15}$$

These equations are general expressions of the fixed fulcrum systems corresponding to the shifting fulcrum systems of the expression (4.14). For example, if $\Delta$=0 in the expressions (4.14) and (4.15), the line A-D of the expression (4.2) and the envelope $E_S$ of the expressions (4.8) are determined. Likewise, if $\Delta=\pi/2$, the line D-C of the expression (4.4) and the envelope $E_T$ of the expressions (4.9) are determined.

Next, the normal of the envelope expressed by the expressions (4.15) is determined as $$y = \cot(\theta+\Delta) \cdot (x-r\theta) \tag{4.16}$$

and independent of the values a and b. This shows that, with the constant value r, the normals of all envelopes intersect at the point of x=r$\theta$ and y=0, which is the intersection of the x-axis and the line of action of the gravity (the point of contact between the rolling virtual circle and the x-axis). It was previously stated with regard to the two fulcrum systems on the rectangular body that the gravity and reactions balance. Because the same applies to these general expressions, it is theoretically possible to set numberless fulcrum systems. When a body is supported by a large number of fulcrums, the reaction at each of the fulcrums is equal to the total resultant force divided proportionally so as to balance with the gravity of the body.

The fulcrum systems of this embodiment are featured by their high stability because the body is supported at a number of points. In addition, it is easy to move the body because there are both sliding and rolling elements at the contact points. Differently from the second and third embodiments, however, it is preferable that the coefficient of friction be lower in general because of the sliding element. For that purpose, the fulcrum system surfaces may be worked to be sufficiently smooth, and may be lubricated if there is a need of extremely smooth movement. Otherwise, the contact may be changed into rolling contact by forming either of shifting and fixed fulcrum systems with an array of needlelike rollers.

Fifth Embodiment

Figure 12A:
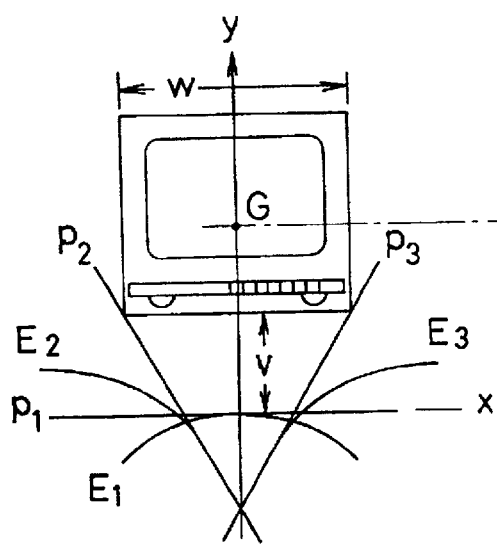
FIGS. 12(a) and 12(b) show the fifth embodiment, where the invention is applied to a television rack.
Figure 12B:
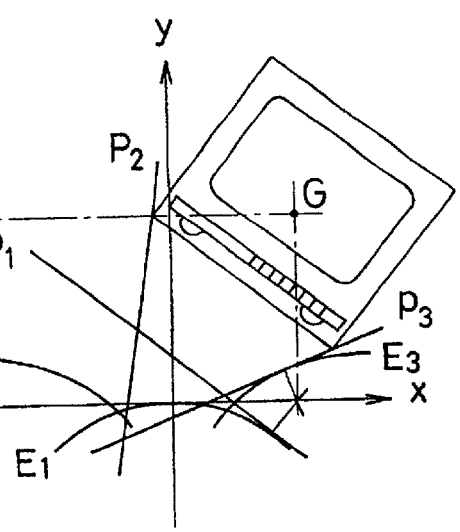
Figure 13:
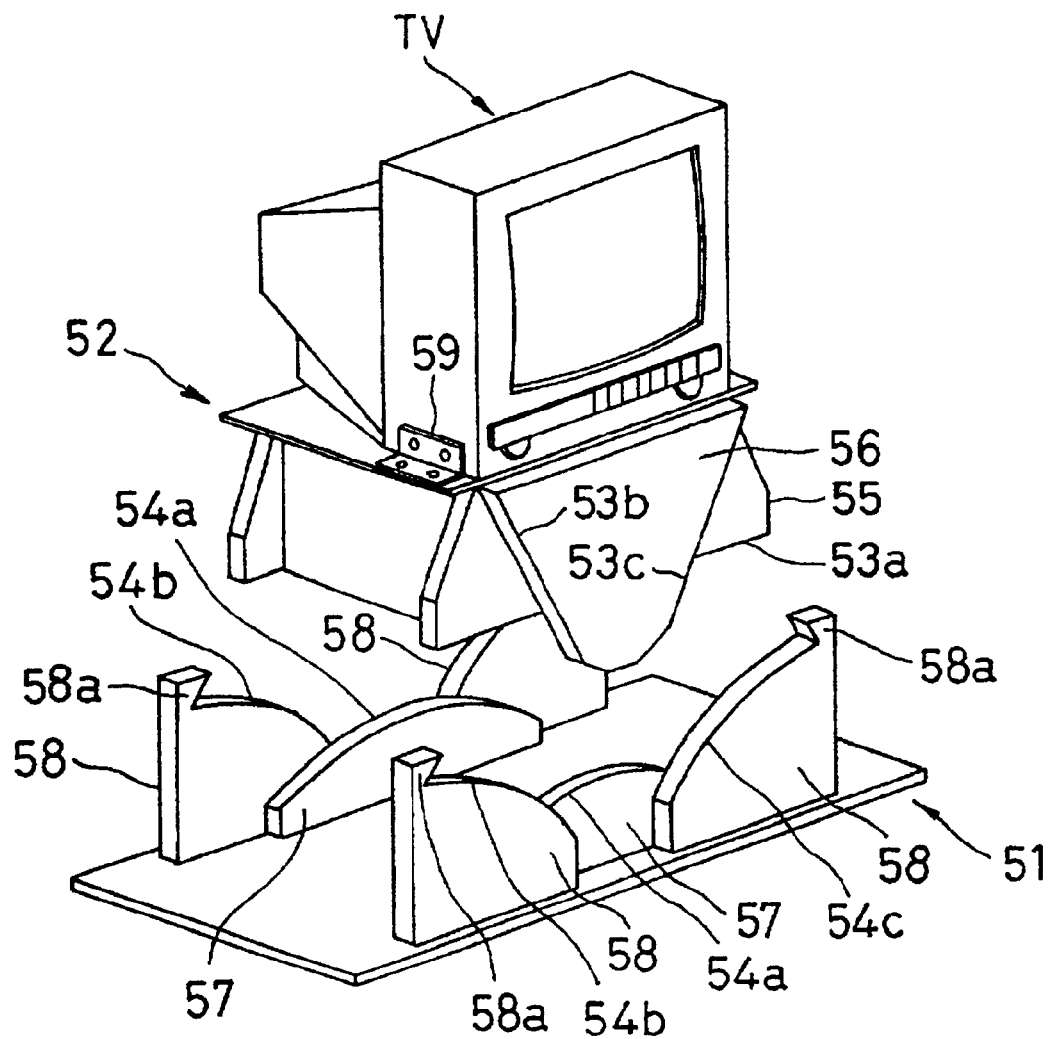
FIG. 13 is a perspective view of a television rack according to the invention.
Figure 14:
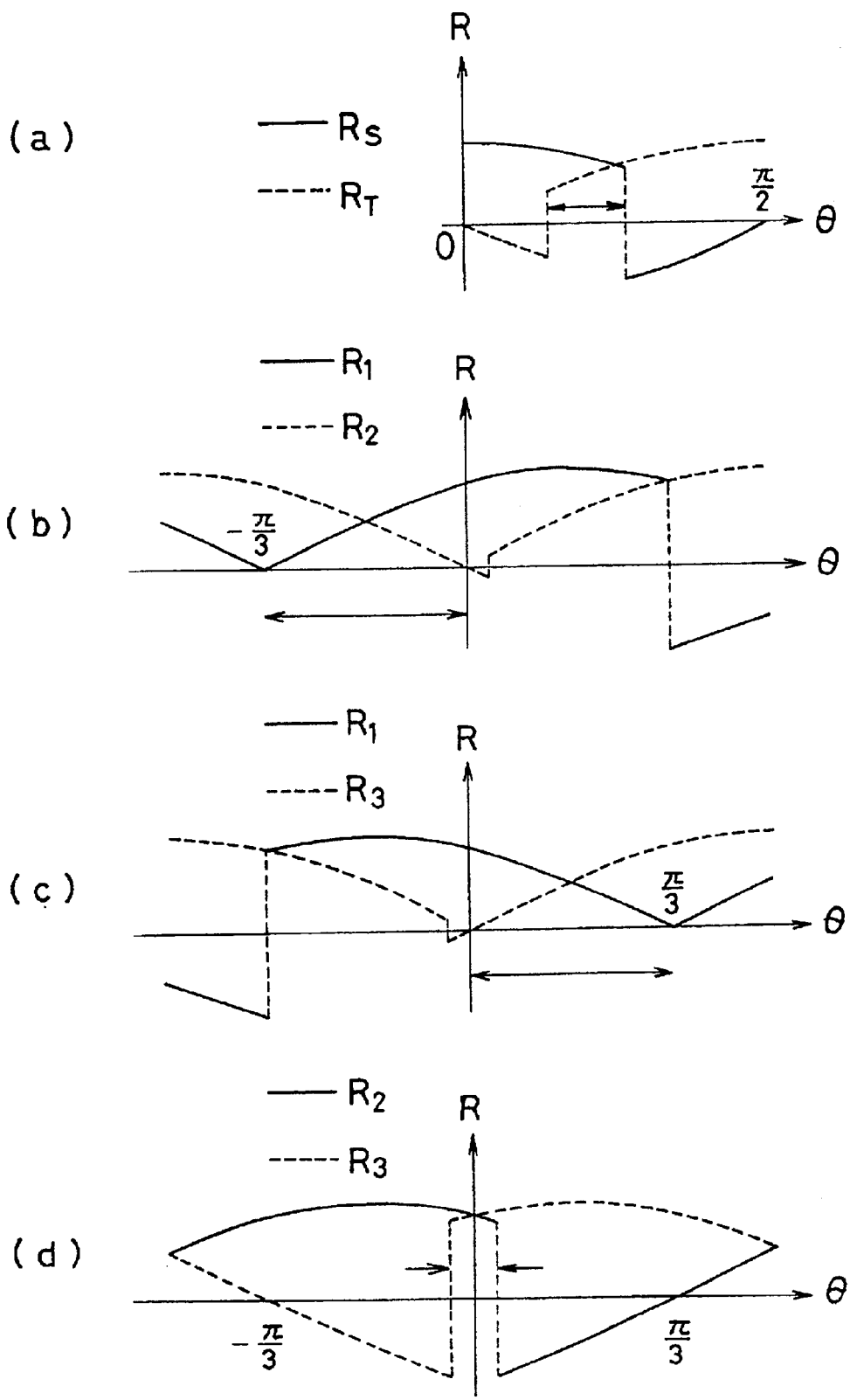
FIGS. 14(a) through 14(d) are graphs showing the relationships between the reactions and inclinations of the fourth and fifth embodiments.

FIGS. 12 and 13 show the fifth embodiment.

This embodiment is a television rack which can incline right and left, and is a specific example of application of the inclining method explained with regard to the fourth embodiment. This method is suitable to incline a television set with small force in a stepless manner in order to keep the television screen at a desired angle. This method is suitable also to support a television set stably at a selected angle. Of course, it is also possible to use this method for a television rack which can incline up and down.

As shown in FIG. 12(a), a television with a width w is imagined. The center of the television is positioned on the y-axis of an x-y coordinate system. The bottom of the television is positioned at a height v from the x-axis. Three shifting fulcrum systems $p_1$, $p_2$ and $p_3$ are set under or below the television. The system $p_1$ extends on the x-axis. The systems $p_2$ and $p_3$ contact with the left-hand and right-hand lower corners respectively of the television, and define an inverse equilateral triangle with the television bottom side. In accordance with these fulcrum systems, a television rack will be made as described later. The position of the center of gravity G of the rack and television in combination is estimated. Because the center of gravity G is the center of the virtual rolling circle stated with regard to the previous embodiment, its y-coordinate value is assumed to be the radius r of the circle. In this case, the shifting fulcrum system equation is expressed by the expression (4.14), so its coefficients or factors a and b are determined as stated below. If $\theta=0$, the expression (4.14) will be as follows.

$$y-(r-b)=-\tan \Delta \cdot (x-a) \quad (5.1)$$

Therefore, the shifting fulcrum system in initialized condition extends through the coordinate (a, r-b), and the inclination measured clockwise from the x-axis is $\Delta$. Consequently:

the shifting fulcrum system pi extends on the x-axis as shown in FIG. 12(a), so a=any constant, b=r, and $\Delta=0$;

$p_2$ extends through the coordinate (-w/2, v), and the inclination is $\pi/3$, so a=-w/2, b=r-v, and $\Delta=\pi/3$;

$p_3$ extends through the coordinate (w/2, v), and the inclination is $2\pi/3$, so a=w/2, b=r-v, and $\Delta=2\pi/3$.

If the shifting fulcrum system equation is determined, it is possible to obtain the envelopes, that is to say, the fixed fulcrum system equations from the expressions (4.15). FIGS. 12(a) and 12(b) show the envelopes $E_1$, $E_2$ and $E_3$ associated with the shifting fulcrum systems $p_1$, $p_2$ and $p_3$ respectively in this case. When the television and rack incline on the plus side of the x-axis, as shown in FIG. 12(b), the rack is supported by the fulcrum systems $p_1$-$E_1$ and $p_3$-$E_3$. Contrariwise, when the television and rack incline on the minus side, the rack is supported by the fulcrum systems $p_1$-$E_1$ and $p_2$-$E_2$. When the inclination is near to 0, the rack is supported at three points by all of the fulcrum systems.

The shifting fulcrum systems $p_1$, $p_2$ and $p_3$ have, however, been set approximately. Therefore, even if these systems are calculated here with proper numerical values, the resultant envelopes are not always what is expected. It is consequently necessary to confirm the range, as a value of the inclination $\theta$, in which the envelopes are effective as fixed fulcrum systems. If the range is not what is expected, it is necessary to vary the (setting) conditions for the shifting fulcrum systems in accordance with the purpose. That is to say, before setting the shifting fulcrum systems, it is preferable to be able to visually predict the effective range of inclinations in advance. For that purpose, it is examined how the value of the reaction R acting on the body on an envelope changes as the inclination varies. Equilibrium is reached in the range where reactions are meaningful plus values at the same time. Therefore, this range may be considered as the effective range of inclinations. The reaction R will be found below.

The envelope E of the expressions (4.15) is expressed vectorially as follows.

$$E(\theta)=x(\theta)i+y(\theta)j \quad (5.2)$$

where i and j are unit vectors along the x-axis and y-axis respectively. In this case, the unit normal vector n of this envelope is expressed from the well-known formula for the theory of curves as follows.

$$n = \rho \cdot \frac{d^2 E}{ds^2} \quad (5.3)$$

where $\rho$ is the radius of curvature and s is the curve length.

When a shifting fulcrum system inclines from a certain angle $\beta$ to $\theta$, the length s of its envelope is expressed, with the upper limit value $\theta$ for integration being a variable, as follows.

$$s = \int_\beta^\theta \sqrt{\left(\frac{dx}{d\theta}\right)^2 + \left(\frac{dy}{d\theta}\right)^2}\, d\theta \quad (5.4)$$

$$= \int_\beta^\theta \{2r\cos(\theta + \Delta) + a\sin\Delta - b\cos\Delta\}\, d\theta$$

Consequently, the radius of curvature $\rho$ is as follows.

$$\rho = \frac{ds}{d\theta} = 2r\cos(\theta + \Delta) + a\sin\Delta - b\cos\Delta \quad (5.5)$$

On the other hand, $$\frac{d^2 E}{ds^2} = \left(\frac{d^2 x}{d\theta^2}\left(\frac{d\theta}{ds}\right)^2 + \frac{dx}{d\theta}\frac{d^2\theta}{ds^2}\right)i + \quad (5.6)$$

$$\left(\frac{d^2 y}{d\theta^2}\left(\frac{d\theta}{ds}\right)^2 + \frac{dy}{d\theta}\frac{d^2\theta}{ds^2}\right)j$$

$$= \frac{-\{\sin(\theta + \Delta)i + \cos(\theta + \Delta)j\}}{2r\cos(\theta + \Delta) + a\sin\Delta - b\cos\Delta}$$

Therefore, if the expressions (5.5) and (5.6) are substituted into the expression (5.3), then $$n=-\{\sin(\theta+\Delta)i + \cos(\theta+\Delta)j\}. \quad (5.7)$$

Differently from a space curve, the curvature of a plane curve may be either of a positive value and a negative value. The normal vector n extends toward the center of curvature if the curvature is positive, and vice versa (Chuji Adachi "BIBUN KIKAGAKU GAISETSU", page 45, Baifukan). By contrast, the reaction is considered to act on the envelope always away from the center of curvature. That is to say, if the envelope curvature is plus, the reaction acts reversely to the normal vector, and vice versa. Therefore, if R ($\geq 0$) is defined as the size of the reaction vector R, the vector can be expressed as follows.

$$R = -\frac{\rho}{|\rho|} Rn = \frac{\rho}{|\rho|} R\{\sin(\theta + \Delta)i + \cos(\theta + \Delta)j\} \quad (5.8)$$

Under the condition of equilibrium of forces when a body is supported by two envelopes $E_S$ and $E_T$, there exists the following relationship between the body gravity F and the reactions $R_S$ and $R_T$.

$$F + R_S + R_T = 0 \quad (5.9)$$

where $$R_S = \frac{\rho_S}{|\rho_S|} R_S\{\sin(\theta + \Delta_S)i + \cos(\theta + \Delta_S)j\}$$

$$R_T = \frac{\rho_T}{|\rho_T|} R_T\{\sin(\theta + \Delta_T)i + \cos(\theta + \Delta_T)j\}.$$

$\rho_S = 2r \cos(\theta + \Delta_S) + a_S \sin \Delta_S - b_S \cos \Delta_S$ $\rho_T = 2r \cos(\theta + \Delta_T) + a_T \sin \Delta_T - b_T \cos \Delta_T$ The above expression can be rewritten for the components along the x- and y-axes as follows.

$$\frac{\rho_S}{|\rho_S|} R_S \sin(\theta + \Delta_S) + \frac{\rho_T}{|\rho_T|} R_T \sin(\theta + \Delta_T) = 0 \quad (5.10)$$

$$\frac{\rho_S}{|\rho_S|} R_S \cos(\theta + \Delta_S) + \frac{\rho_T}{|\rho_T|} R_T \cos(\theta + \Delta_T) - F = 0 \quad (5.11)$$

The simultaneous equations (5.10) and (5.11) can be solved for $R_S$ and $R_T$ as follows.

$$R_S = \frac{|\rho_S|}{\rho_S} \cdot \frac{\sin(\theta + \Delta_T)}{\sin(\Delta_T - \Delta_S)} \cdot F \quad (5.12)$$

$$R_T = \frac{|\rho_T|}{\rho_T} \cdot \frac{\sin(\theta + \Delta_S)}{\sin(\Delta_S - \Delta_T)} \cdot F$$

$(R_S, R_T \geq 0)$

FIG. 14(a) plots, with the inclination θ along the axis of abscissas, the reactions $R_S$ and $R_T$ for the previous (fourth) embodiment. The body keeps its balance only in the range (indicated by the bi-directional arrow) where both of the reactions $R_S$ and $R_T$ are positive values in this graph. In this case, as stated above, the peripheries of the rectangular body are determined as shifting fulcrum systems, so the balance is kept within the limited narrow angle of the expression (4.13). In this graph, the range is shown as the width indicated by the two-way arrow along the axis of abscissas. In addition, it is possible to read directly as values along the axis of ordinates the changes of reaction in this range. This graph was described with a graphic function of spreadsheet software on a personal computer. Therefore, by simulating under various (setting) conditions for the shifting fulcrum systems, it is possible to select such optimum (setting) conditions as balance the body in a desired range of inclinations.

FIGS. 14(b), 14(c) and 14(d) show similar graphs for the fifth embodiment. FIG. 14(b) shows a case where balance is taken into consideration with the envelopes $E_1$ and $E_2$ determined as fixed fulcrum systems. The envelope $E_2$ described in FIG. 12 corresponds to the range indicated by the two-way arrow in FIG. 14(b). As obvious from this graph, there are other ranges of inclinations in which equilibrium is reached in mathematical expressions, although these portions of the envelope $E_2$ are not shown in FIG. 12. As far as the set shifting fulcrum systems are not bars to the practical use, it is possible to use these ranges also. FIG. 14(c) shows the range of angles where equilibrium is reached on the envelopes $E_1$ and $E_3$, in (bi)lateral symmetry with FIG. 14(b). FIG. 14(d) shows the balance on the envelopes $E_2$ and $E_3$. On the envelopes $E_2$ and $E_3$ described in FIG. 12, the balance is limited to a narrow range near the inclination of 0 degree. In this narrow range, as obvious also from the fact that FIGS. 14(b) and 14(c) overlap, the body is supported at three points on the envelopes $E_1$, $E_2$ and $E_3$. Thus, by making continuous the ranges of inclinations which satisfy the condition of equilibrium in FIGS. 14(b) through 14(d), it is possible to incline the body in a wide range of angles (between $-\pi/3$ and $+\pi/3$ in this embodiment). The reaction values plotted in FIG. 14(d) are those when the body is assumed to be supported by only $E_2$ and $E_3$. In practice, however, $E_1$ exists, so these values are smaller.

FIG. 13 shows a television rack made with such fulcrum systems. The rack includes a base 51 and a table 52, which is illustrated as lifted a little from the base.

The table 52 includes two pairs of combination plates 55 and 56 symmetrically at the front and rear of its bottom. Each of the plates 55 has a shifting fulcrum system 53a formed on its bottom side, which corresponds to the system pi in FIGS. 12(a) and 12(b). Likewise, the plate 56 has shifting fulcrum systems 53b and 53c formed on its oblique sides, which correspond to the systems $p_2$ and $p_3$ respectively in FIGS. 12(a) and 12(b).

The base 51 includes two sets of combination support plates 57 and 58 at the front and rear of its top for engagement with the table combination plates 55 and 56 respectively. Each of the support plates 57 has a fixed fulcrum system 54a formed on its upper side, which corresponds. to the system $E_1$ in FIGS. 12(a) and 12(b). Likewise, each of the support plates 58 has a fixed fulcrum system 54b or 54c formed on its upper side, which corresponds to the system $E_2$ or $E_3$ in FIGS. 12(a) and 12(b).

As stated above, the TV on the table 52 is balanced always at any angle. Therefore, if the fulcrum system contact areas are smooth, it is possible to adjust the TV angle freely by pushing an upper portion of the TV right or left. As a result, the TV can be kept at a desired angle. The TV is fixed to the table 52 with fixtures or fittings 59 in order not to slide and fall. Each of the four support plates 58 has a stopper 58a protruding from its top to prevent the table 52 from inclining beyond the limit and being out of balance.

This rack is made in accordance with FIGS. 12(a) and 12(b), and therefore a little too large in comparison with the TV. It is, however, possible to make a smaller rack by making the radius of the virtual rolling circle smaller. As stated also in regard to the previous embodiment, it is possible to set numberless fulcrum systems. Therefore, by adding more fulcrum systems, it is also possible to enlarge the angle of inclination until the TV can incline by 90 degrees.

Sixth Embodiment

As stated with regard to the fourth embodiment, it is theoretically possible to set numberless fulcrum systems. Similarly to the previous embodiment, this embodiment is an example of application of the second inclining method explained with regard to the fourth embodiment. The example is a personal computer display rack for freely adjustable inclination. In particular, multiple fulcrum systems are set for the rack.

Figure 15A:
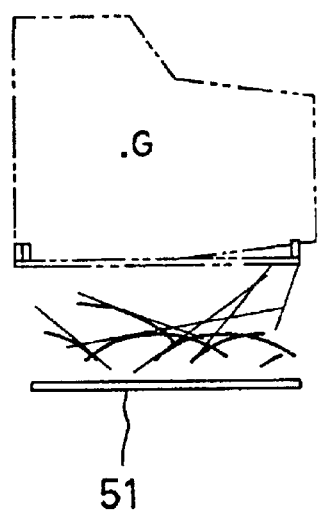
FIGS. 15(a) through 15(c) show the sixth embodiment, where multiple fulcrum systems are set.
Figure 15B:
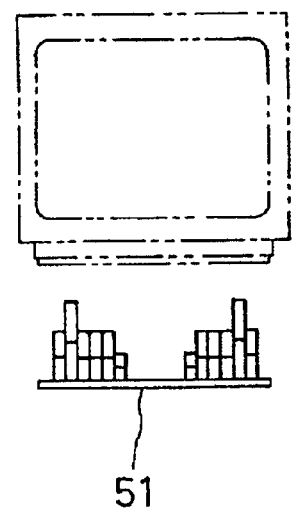
Figure 15C:
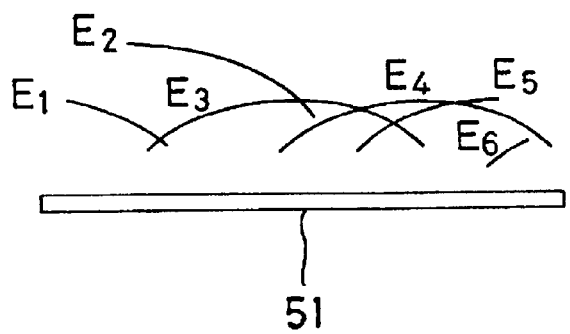
Figure 15C:
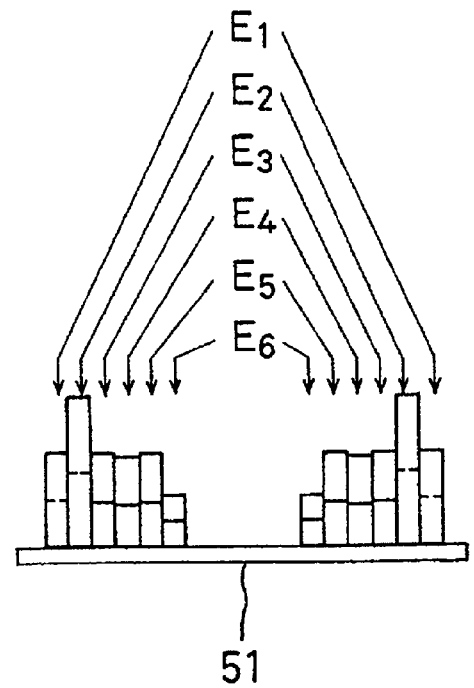

FIG. 15(a) is a side view of the arrangement of fulcrum systems. The six fulcrum systems include fixed fulcrums systems, which are shown by thick solid lines, and shifting fulcrum systems, which are shown by thin solid lines. FIG. 15(b) is a front view of the fixed fulcrum systems illustrated out of the actually made fulcrum systems. For balance, the fixed fulcrum systems are arranged in lateral symmetry on top of the base 51. As shown in FIG. 15(c), the fixed fulcrum systems are identified with symbols $E_1$ through $E_6$. Though not shown for simplicity, the associated shifting fulcrum systems are arranged on the bottom of the table 52, which supports the display.

As stated in regard to the previous embodiment, it is possible to balance two fulcrum systems with each other within a limited angle. By calculating the reaction R between the systems, it is possible to calculate the range of angles. In a case like this embodiment, where six fulcrum systems are set, the number of the combinations made by every pair (all pairs) of fulcrum systems is $_6C_2=15$. A certain range of equilibrium is reached for 12 of the 15 combinations.

Figure 16:
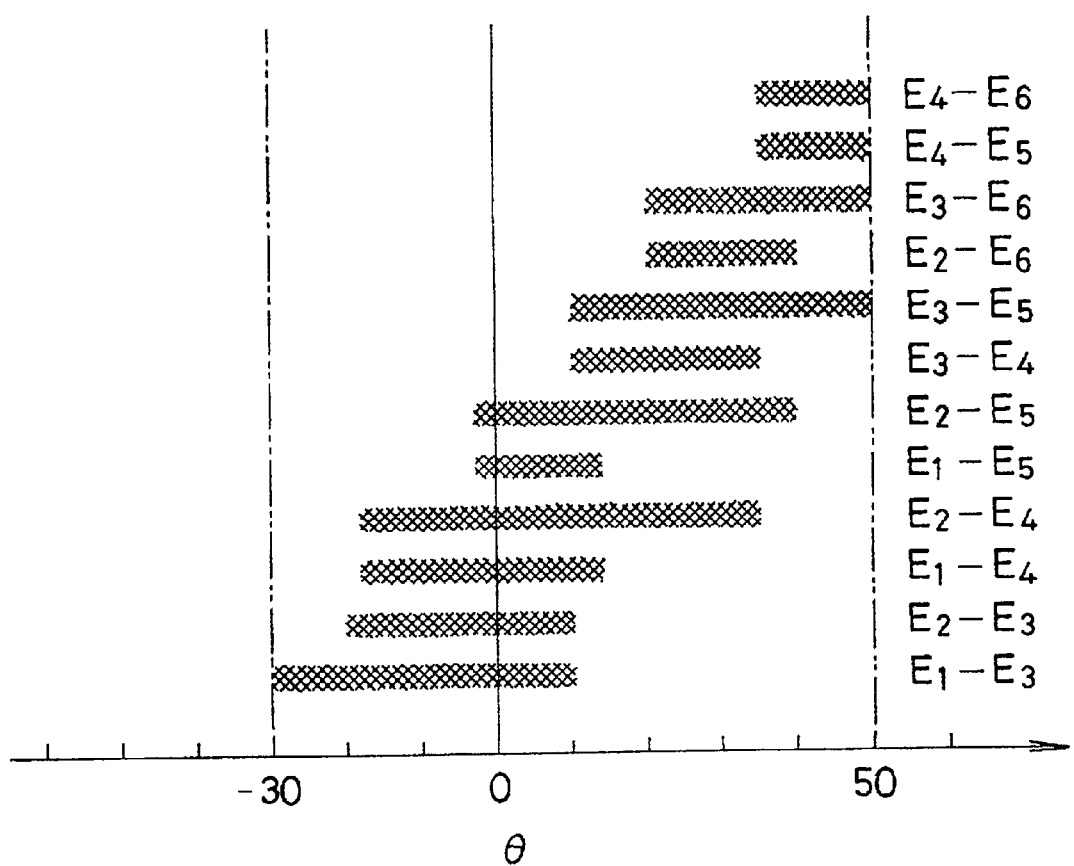
FIG. 16 is a graph showing the ranges of angles in which equilibrium is reached for the fulcrum system arrangement shown in FIGS. 15(a) through 15(c)
Figure 17A:
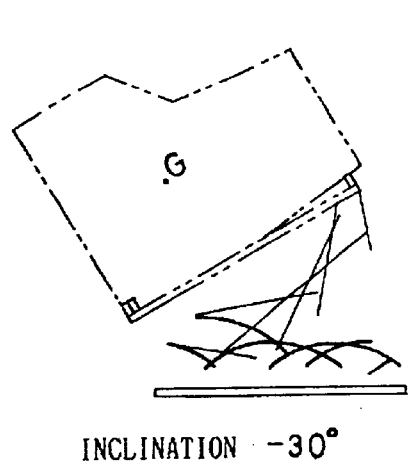
FIGS. 17(a) and 17(b) show display racks inclined at the limits of the ranges of angles shown in FIG. 16.
Figure 17B:
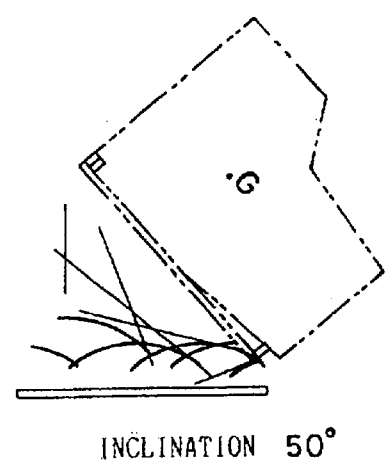

FIG. 16 plots the ranges of angles in which equilibrium is reached for these combinations of fulcrum systems. With the axis of abscissas representing the inclination θ of the display, FIG. 16 graphically shows the ranges where equilibrium is reached. Each of the combinations is represented by the symbol E for the fixed fulcrum systems. As shown, the range of inclinations for each of the combinations is limited. Mutually overlapping, however, the ranges cover a wide range of angles of inclination between −30 (FIG. 17a) and +50 (FIG. 17b) degrees.

The inclining book and television racks have been presented as examples of application of the present invention, which may, however, be applied in various ways. For example, the inclining method using a single fulcrum may be applied to an apparatus for raising an architectural panel piece or another thin material, or an apparatus for turning a stone or another heavy body over. The inclining method using a plurality of fulcrums can freely incline a body and make it stationary, and may therefore be applied to a table for inspecting or repairing a machine or the like. In this case, the workman can work without assuming unnatural postures, and therefore improve the rate of work. In a general work area where a heavy body is inclined with its center of gravity varying in height, it would be possible to improve the energy efficiency and the working efficiency by applying the present invention.

What is claimed is:

1. A method of inclining a body placed on a base, the method comprising the steps of setting a fixed fulcrum system and a shifting fulcrum system on the base and the body respectively;

forming such a combination of the fulcrum systems that the shifting fulcrum system can shift on the fixed fulcrum system;

shaping the fixed fulcrum system in the form of an envelope on the shifting fulcrum system shifting in such a manner as to satisfy the condition of equilibrium and the condition of constancy in potential energy of the body; and inclining the body while moving a fulcrum resulting from the combination of the fulcrum systems.

2. The method of claim 1, wherein the fulcrum is positioned on or near the line of action of the gravity of the body, the shifting and fixed fulcrum systems engaging with each other without slipping.

3. The method of claim 1, wherein the body is supported by a plurality of fulcrums at the same time, the shifting fulcrum system being able to slip on the fixed fulcrum system.

* * * * *